(12) United States Patent
Gonzales et al.

(10) Patent No.: US 9,494,710 B2
(45) Date of Patent: Nov. 15, 2016

(54) DETERMINING WELL INTEGRITY

(75) Inventors: Adolfo Gonzales, Houston, TX (US);
Robert Mitchell, Houston, TX (US)

(73) Assignee: Landmark Graphics Corporation,
Houston, TX (US)

( * ) Notice: Subject to any disclaimer, the term of this patent is extended or adjusted under 35 U.S.C. 154(b) by 526 days.

(21) Appl. No.: 14/111,729

(22) PCT Filed: Apr. 19, 2011

(86) PCT No.: PCT/US2011/033080
§ 371 (c)(1),
(2), (4) Date: Oct. 14, 2013

(87) PCT Pub. No.: WO2012/144991
PCT Pub. Date: Oct. 26, 2012

(65) Prior Publication Data
US 2014/0039797 A1    Feb. 6, 2014

(51) Int. Cl.
G01V 99/00    (2009.01)
E21B 47/00    (2012.01)

(52) U.S. Cl.
CPC ............. *G01V 99/005* (2013.01); *E21B 47/00* (2013.01)

(58) Field of Classification Search
CPC .............................. E21B 47/00; G01V 99/005
USPC .......... 702/6, 9, 10, 11, 13, 50, 55; 166/250.01, 302, 368, 380, 381
See application file for complete search history.

(56) References Cited

U.S. PATENT DOCUMENTS

| 6,774,806 | B1 | 8/2004 | Bannell et al. |
| 6,967,589 | B1 | 11/2005 | Peters |
| 7,274,989 | B2 | 9/2007 | Hopper |
| 7,346,456 | B2 | 3/2008 | Le Bemadjiel |
| 7,415,357 | B1 | 8/2008 | Stluka et al. |
| 7,502,695 | B2 | 3/2009 | DeVries et al. |
| 7,578,350 | B2 | 8/2009 | Cooper et al. |
| 7,845,404 | B2 | 12/2010 | McStay et al. |
| 2005/0209836 | A1 | 9/2005 | Klumpen et al. |
| 2007/0213935 | A1 | 9/2007 | Fagnou et al. |
| 2009/0308616 | A1 | 12/2009 | Wylie et al. |

(Continued)

OTHER PUBLICATIONS

European Communication pursuant to Rule 114(2) EPC, European Patent Application No. 11864117.4, Aug. 26, 2014, 13 pages.

(Continued)

*Primary Examiner* — John H Le
(74) *Attorney, Agent, or Firm* — Alan Bryson; Parker Justice, P.C.

(57) ABSTRACT

A method performed with a computing system for determining well integrity includes receiving a selection of a well configuration of a well, and receiving a selection of a wellbore operation performed with the well configuration. The selected well configuration includes one or more casing strings and a production tubing extending from adjacent a wellhead of the well to adjacent a bottom of the well. In some examples, the method further includes determining, based on the well configuration and the wellbore operation, a characteristic of the well at or adjacent the one or more casing strings and the production tubing during the wellbore operation, and modifying the well configuration to remove the production tubing. In some examples, the method still further includes determining, based on the modified well configuration and the wellbore operation, the characteristic of the well at or adjacent the one or more casing strings during the wellbore operation.

21 Claims, 18 Drawing Sheets

(56) References Cited

U.S. PATENT DOCUMENTS

| | | |
|---|---|---|
| 2009/0308657 A1 | 12/2009 | Clark et al. |
| 2010/0096138 A1 | 4/2010 | Hermes et al. |
| 2010/0198533 A1 | 8/2010 | Peacock et al. |
| 2010/0319933 A1 | 12/2010 | Baugh |
| 2011/0048737 A1 | 3/2011 | Schneider |

OTHER PUBLICATIONS

WJP Enterprises, "Annular Casing Pressure Management for Offshore Wells," Feb. 2006, Draft Revision K of American Petroleum Institute Recommended Practice 90, 113 pages.

Sultan et al., "Real-Time Casing Annulus Pressure Monitoring in a Subsea HPHT Exploration Well," Offshore Technology Conference OTC 19286, Copyright 2008, 11 pages.

Patent Examiner Sunil Kaul, Patent Examination Report No. 1, Australian Patent Application No. 2011366243, Feb. 5, 2015, 3 pages.

Patent Examiner Chau Tran, Canadian Office Action, Canadian Application No. 2,831,721, Feb. 24, 2015, 3 pages.

Official Action, Eurasian Patent Office, Nov. 4, 2015, 4 pages.

Halliburton, "WellSolver™ Real-Time Well Management" www.halliburton.com/ps/default.aspx?, Mar. 29, 2011 (2 pages).

Notification of Transmittal of the International Search Report and the Written Opinion of the International Searching Authority, or Declaration (1 page); International Search Report (3 pages); and Written Opinion of the International Searching Authority (14 pages), mailed Jul. 7, 2011, for related international application PCT/US2011/033080.

Landmark Proven Solutions, Integrated Solutions & Innovative Technologies, Directory, Apr. 4, 2010, 32 pages.

European Patent Office, Extended European Search Report, EP Application No. 11864117.4, Apr. 15, 2016, 8 pages.

Adamson et al., "High-Pressure, High-Temperature Well Construction", Jan. 1, 1998, XP055262975, Retrieved from the Internet: URL:https://www.slb.com/~/media/Files/resources/oilfield_review/ors98/sum98/pgs_36_49.pdf [retrieved on Apr. 5, 2016], 14 pages.

Khafiz. Muradov, "Temperature modelling and real-time flow rate allocation in wells with advanced completion", Nov. 1, 2010, XP055262980, Retrieved from the Internet: URL: http://www.ros.hw.ac.uk/bitstream/handle/10399/2405/MuradovK_11IO_pe.pdf?sequence=1 &isAllowed=y [retrieved on Apr. 5, 2016], 210 pages.

Casing and Tubing Configuration

| | Name | Type | OD (in) | MD (ft) | | | Hole Size (in) | Annulus Fluid |
|---|---|---|---|---|---|---|---|---|
| | | | | Hanger | TOC | Base | | |
| 1 | Surface | Casing | 22.000 | 5419.9 | 5500.0 | 7000.0 | 26.000 | Seawater |
| 2 | Surface | Liner | 18 5/8 | 6700.0 | 7500.0 | 8500.0 | 24.000 | 9.50 ppg OBM |
| 3 | Intermediate | Casing | 16.000 | 5419.9 | 9500.0 | 13000.0 | 17 1/2 | 11.28 ppg OBM |
| 4 | Intermediate | Liner | 13 5/8 | 12700.0 | 14000.0 | 17000.0 | 17 1/2 | 12.46 ppg OBM |
| 5 | Production | Casing | 9 5/8 | 5419.9 | 18000.0 | 21000.0 | 12 1/4 | 16.0 ppg OBM |
| 6 | Production | Tubing | 5 1/2 | 5419.9 | | 21000.0 | | 12 ppg CaCl2 |
| 7 | | | | | | | | |

String Sections - 9 5/8" Production Casing

| | MD (ft) | | Pipe | | | | Connection | | | Pipe Insulation | |
|---|---|---|---|---|---|---|---|---|---|---|---|
| | Top | Base | Type | OD (in) | Weight (ppf) | Grade | Pipe Name | Grade | OD (in) | Material | Thickness |
| 1 | 5419.9 | 9000.0 | | 9 5/8 | 47.000 | Q-125 | <N/A> | | | None | 0.000 |
| 2 | 9000.0 | 21000.0 | | 7.000 | 29.000 | P-110 | <N/A> | | | None | 0.000 |
| 3 | | | | | | | | | | | |

Well Flow Tubingless Details

| Production Casing | Options | Comments |

Pressure : 15000.00 psi    Location : Perforations ▼

Perforation Depth : 21000.0 ft MD

Inlet Temperature : 275.00 °F

Production Rates
Oil : 100000 bbl/D
Water : 0 bbl/D

Duration
◉ Time : 1.00000 yrs ▼
○ Volume : 36500000.0 bbl Oil ▼

[ OK ]  [ Cancel ]  [ Apply ]  [ Help ]

Seawater Displacement Details

| Production Casing | Options | Comments |

Pressure : 9400.00 psi    Location : Perforations

Perforation Depth : 21000.0 ft MD

Inlet Temperature : 175.00 °F

Production Rate : 10286 bbl/D

Duration
- ⦿ Time : 30 min
- ○ Volume : 214.3 bbl

| OK | Cancel | Apply | Help |

FIG. 5H

DETERMINING WELL INTEGRITY

TECHNICAL BACKGROUND

This disclosure relates to determining well integrity in, for example, subsea, deepwater environments.

BACKGROUND

Technical, operational and organizational solutions can be applied to reduce risk of uncontrolled release of formation fluids throughout the life cycle of a well. One of the solutions is to use computer software to relatively accurately model (detection, optimization, prediction, or otherwise.) well construction and operation. A production well usually includes liners, casing (head, spools and hangers), cement, annulus between casings, tubing (head and hanger), packoff seals, test plugs, bowl protectors, and mudline suspension systems, and other components. Under operation, the well experiences varying temperatures and pressures, which can cause increased stresses on the components and may cause displacement and/or expansion of fluids in the annulus between components. Because of such change in loading conditions to the well, the well integrity can be affected. For example, some common well integrity issues include casing collapse, casing burst, and liftoff from the wellhead, among others. Well integrity may be even more difficult to determine in subsea wells, because the wellhead is not readily accessible or capable of being easily monitored (e.g., for fluid leakages and other indications of well integrity problems). Thus, relatively accurate models of well configurations, including configurations of subsea wells, may help determine and/or predict well integrity issues prior to, during, or after well completion.

DESCRIPTION OF DRAWINGS

FIGS. 5A-5K illustrate example user interfaces from a well integrity tool for determining well integrity of a well configuration.

DETAILED DESCRIPTION

Figure 1:
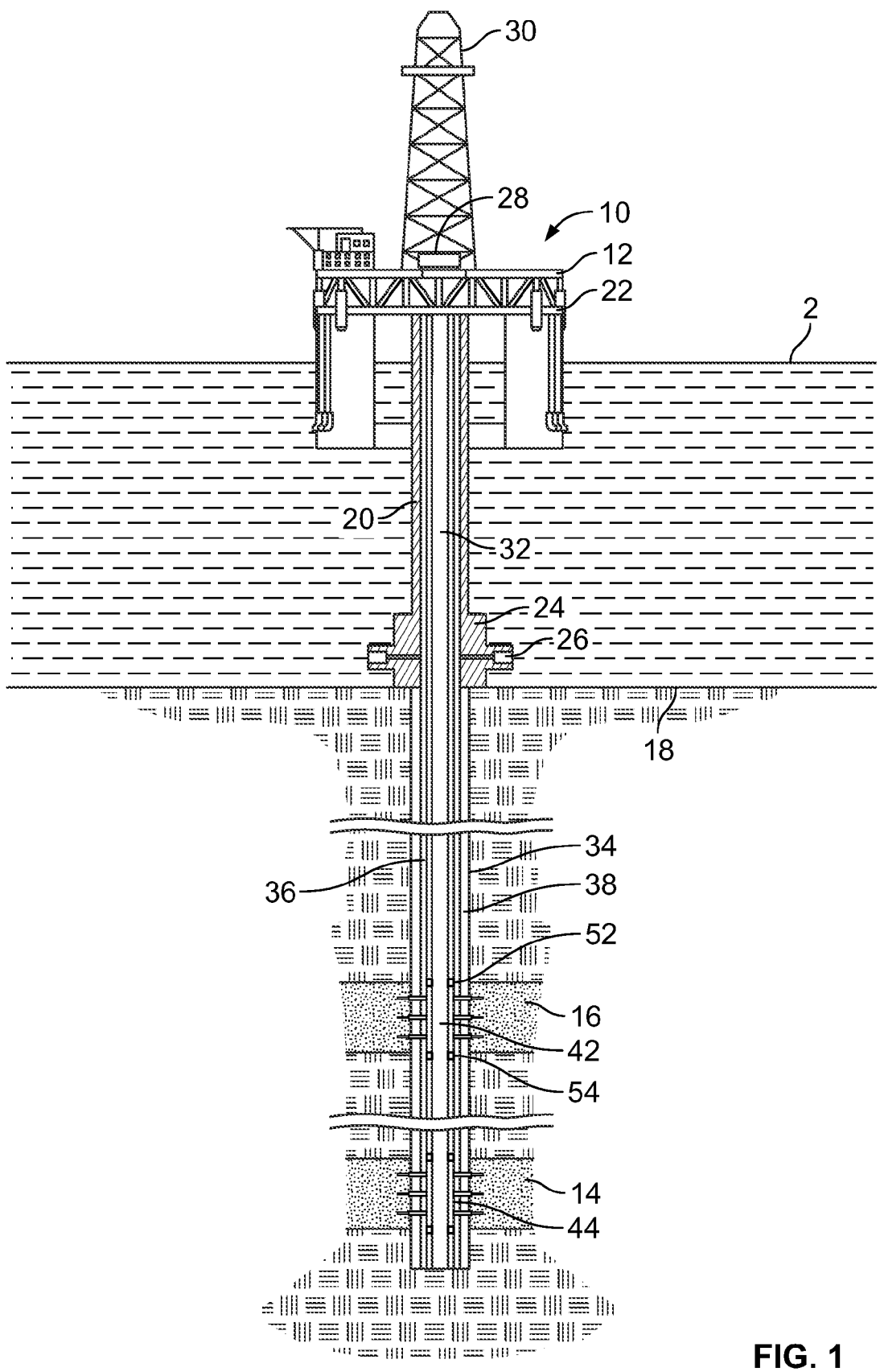
FIG. 1 illustrates an example well system in a deepwater subsea environment.

In some embodiments, a well integrity tool implemented on a computation device determines and/or predicts well integrity of a well configuration (e.g., a proposed well configuration or a constructed (all or partially) well). The well integrity tool can analyze, compute, optimize, determine and predict critical values or properties of the well integrity, therefore aiding well design/planning and preventing various failure modes. Complex well loading conditions can be evaluated with this disclosure. Well design engineers can plan ahead against conventional well loading conditions that could become critical, as well as complex well loading conditions that could be detrimental to the well integrity, safety and the environment.

One or more embodiments of a well integrity tool according to the present disclosure may include one or more of the following features. For example, the well integrity tool may use temperature and pressure information to accurately calculate the loading conditions and to facilitate and simplify the process for well configuration. The tool does not require completion string and it allows data mining to determine the loading conditions. The tool can determine the integrity of a well in several different cases, for example: between installation of a production casing and a production tubing; in a tubingless production environment, which has a configuration where a production tubing has not been installed; in a well configuration with a cemented production casing and a well configuration with an uncemented production casing; by determining if one or more casings of a multistring well configuration lift off from a wellhead (i.e., vertically displace from a set position after completion but before production); and in a nonproduction event. Such non-production invents include, for example, displacement of a drilling fluid (e.g., a drilling mud) with another fluid, such as seawater) or any other scenario where the casing internal pressure has drastically reduced.

In one general embodiment, a method performed with a computing system for determining well integrity includes receiving a selection of a well configuration of a well comprising one or more casing strings and a production tubing extending from adjacent a wellhead of the well to adjacent a bottom of the well; receiving a selection of a wellbore operation performed with the well configuration; determining, based on the well configuration and the wellbore operation, a characteristic of the well at or adjacent the one or more casing strings and the production tubing during the wellbore operation; modifying the well configuration to remove the production tubing; and determining, based on the modified well configuration and the wellbore operation, the characteristic of the well at or adjacent the one or more casing strings during the wellbore operation.

In one or more specific aspects of the general embodiment, the characteristic may be at least one of: a temperature of a fluid within an annulus defined between two casing strings; a temperature of a casing string in the one or more casing strings in the wellbore; a pressure of the fluid in the annulus; a thermal property of the well configuration; and a displacement force acting on a casing string in the one or more casing strings in the wellbore.

In one or more specific aspects of the general embodiment, the method may further include comparing the displacement force with a predetermined static force acting on the casing string; and providing, based on the comparison, an indication that well integrity of the well is compromised.

In one or more specific aspects of the general embodiment, the static force of the method may include a lock ring rating value. The method may further include providing, based on the comparison, an indication of a lift-off event of the casing string; and providing an indication that the displacement force exceeds the predetermined lock ring rating value.

In one or more specific aspects of the general embodiment, the method may further include comparing the pressure of the fluid in the annulus with a predetermined range of pressure values; and providing, based on the comparison, an indication that well integrity of the well is compromised.

In one or more specific aspects of the general embodiment, the predetermined range of pressure values may include a maximum burst pressure value and a maximum collapse pressure value. The method may further include providing an indication of one of a casing burst or casing collapse event; and providing a graphical indication that the pressure of the fluid in the annulus exceeds one of the maximum burst pressure value or the maximum collapse pressure value.

In one or more specific aspects of the general embodiment, the method may further include providing at least one of a maximum burst pressure value of one casing string in between two annuli; a maximum collapse pressure value of the one casing string in between the two annuli; and a value of an annular fluid expansion in one of the two annuli.

In one or more specific aspects of the general embodiment, the method may further include performing a stress analysis on at least one of a casing string or the production tubing of the well configuration exposed to a thermal event; and determining a temperature deration of the casing string or the production tubing based on the stress analysis.

In one or more specific aspects of the general embodiment, the method of receiving a selection of a well configuration of a well comprising one or more casing strings and a production tubing may further include: receiving values corresponding to an outer diameter and a length of a first casing string; receiving values corresponding to an outer diameter and a length of a second casing string; receiving a selection of a fluid disposed between the first and second casings; and receiving values corresponding to an outer diameter and a length of the production tubing.

In one or more specific aspects of the general embodiment, the method may further include: receiving values corresponding to a weight and grade of one of the first casing string, the second casing string, or the production tubing; receiving a value corresponding to a depth of a top of a cement column associated with one of the first casing string or the second casing string; and receiving values corresponding to a depth and a type of a packer associated with at least one of the first casing string, the second casing string, and the production tubing.

In one or more specific aspects of the general embodiment, the method may further include: receiving values corresponding to a thermal and mechanical properties of one of the first casing string, the second casing string, the production tubing, cement and formation surrounding the wellbore.

In one or more specific aspects of the general embodiment, one of the first casing string or second casing string may include a production casing extending from adjacent the wellhead of the well to adjacent the bottom of the well.

In one or more specific aspects of the general embodiment, the method of the wellbore operation that includes a production operation of a hydrocarbon from a subterranean zone through the wellbore, may further includes at least one of: receiving an identification of the hydrocarbon; receiving a value of a rate of production of the hydrocarbon through the wellbore; and receiving an identification of a thermal-flow calculation mode, a steady state condition of the production operation, and a transient condition of the production operation.

In one or more specific aspects of the general embodiment, the method may further include: receiving a value of a hydrostatic pressure of the hydrocarbon at or near the subterranean zone; and receiving a value of a temperature of the hydrocarbon at or near the subterranean zone.

In one or more specific aspects of the general embodiment, the wellbore operation may include an operation for displacing a volume of drilling mud in the annulus with a volume of seawater. The method of receiving a selection of a wellbore operation performed with the well configuration may include: receiving a value of a flowrate of the seawater into the annulus; receiving a value of a temperature of the seawater; and receiving an identification of a thermal-flow calculation mode, a steady state condition of the displacement operation, and a transient condition of the displacement operation.

In one or more specific aspects of the general embodiment, the method may further include: determining an annular fluid expansion pressure of a fluid between two annuli; modifying the determined annular fluid pressure to account for an open hole leak-off, a density of the fluid, a gas cap volume, or a volume bleed.

In one or more specific aspects of the general embodiment, the well may be a subsea well.

In one or more specific aspects of the general embodiment, the method may further include: determining that the production casing is not cemented in the wellbore; and determining, based on the well configuration, the wellbore operation and the determination that the production casing is not cemented in the wellbore, the characteristic of the well at or adjacent the one or more casing strings and the production tubing during the wellbore operation.

In another general embodiment, an apparatus including a non-transitory and tangible computer readable media includes instructions operable when executed to cause one or more computing systems to perform operations that include: receiving a selection of a well configuration of a well comprising one or more casing strings and a production tubing extending from adjacent a wellhead of the well to adjacent a bottom of the well; receiving a selection of a wellbore operation performed with the well configuration; determining, based on the well configuration and the wellbore operation, a characteristic of the well at or adjacent the one or more casing strings and the production tubing during the wellbore operation; modifying the well configuration to remove the production tubing; and determining, based on the modified well configuration and the wellbore operation, the characteristic of the well at or adjacent the one or more casing strings during the wellbore operation.

In one or more specific aspects of the general embodiment, the characteristic may be a temperature of a fluid within an annulus defined between two casing strings; a temperature of a casing string in the one or more casing strings in the wellbore; a pressure of the fluid in the annulus; a thermal property of the well configuration; or a displacement force acting on a casing string in the one or more casing strings in the wellbore.

In one or more specific aspects of the general embodiment, the operations may further include: comparing the displacement force with a predetermined static force acting on the casing string; and providing, based on the comparison, an indication that well integrity of the well is compromised.

In one or more specific aspects of the general embodiment, the static force may include a lock ring rating value, and the operations may further include: providing, based on the comparison, an indication of a lift-off event of the casing string; and providing an indication that the displacement force exceeds the predetermined lock ring rating value.

In one or more specific aspects of the general embodiment, the operations may further include: comparing the pressure of the fluid in the annulus with a predetermined range of pressure values; and providing, based on the comparison, an indication that well integrity of the well is compromised.

In one or more specific aspects of the general embodiment, the predetermined range of pressure values may include a maximum burst pressure value and a maximum collapse pressure value. The operations may further include: providing an indication of one of a casing burst or casing collapse event; and providing a graphical indication that the pressure of the fluid in the annulus exceeds one of the maximum burst pressure value or the maximum collapse pressure value.

In one or more specific aspects of the general embodiment, the operations may further include providing: a maximum burst pressure value of one casing string in between two annuli; a maximum collapse pressure value of the one casing string in between the two annuli; and a value of an annular fluid expansion in one of the two annuli.

In one or more specific aspects of the general embodiment, the operations may further include: performing a stress analysis on at least one of a casing string or the production tubing of the well configuration exposed to a thermal event; and determining a temperature deration of the casing string or the production tubing based on the stress analysis.

In one or more specific aspects of the general embodiment, the operation of receiving a selection of a well configuration of a well may include: receiving values corresponding to an outer diameter and a length of a first casing string; receiving values corresponding to an outer diameter and a length of a second casing string; receiving a selection of a fluid disposed between the first and second casings; and receiving values corresponding to an outer diameter and a length of the production tubing.

In one or more specific aspects of the general embodiment, the operations may further include: receiving values corresponding to a weight and grade of one of the first casing string, the second casing string, or the production tubing; receiving a value corresponding to a depth of a top of a cement column associated with one of the first casing string or the second casing string; and receiving values corresponding to a depth and a type of a packer associated with at least one of the first casing string, the second casing string, and the production tubing.

In one or more specific aspects of the general embodiment, the operations may further include: receiving values corresponding to a thermal and mechanical properties of one of the first casing string, the second casing string, the production tubing, cement and formation surrounding the wellbore.

In one or more specific aspects of the general embodiment, one of the first casing string or second casing string may be a production casing extending from adjacent the wellhead of the well to adjacent the bottom of the well.

In one or more specific aspects of the general embodiment, the wellbore operation may include a production operation of a hydrocarbon from a subterranean zone through the wellbore. The operations may further include: receiving an identification of the hydrocarbon; receiving a value of a rate of production of the hydrocarbon through the wellbore; and receiving an identification of a thermal-flow calculation mode, a steady state condition of the production operation, and a transient condition of the production operation.

In one or more specific aspects of the general embodiment, the operations may further include: receiving a value of a hydrostatic pressure of the hydrocarbon at or near the subterranean zone; and receiving a value of a temperature of the hydrocarbon at or near the subterranean zone.

In one or more specific aspects of the general embodiment, the wellbore operation may include an operation for displacing a volume of drilling mud in the annulus with a volume of seawater. The operation of receiving a selection of a wellbore operation performed with the well configuration may include: receiving a value of a flowrate of the seawater into the annulus; receiving a value of a temperature of the seawater; and receiving an identification of a thermal-flow calculation mode, a steady state condition of the displacement operation, and a transient condition of the displacement operation.

In one or more specific aspects of the general embodiment, the operations may further include determining an annular fluid expansion pressure of a fluid between two annuli and modifying the determined annular fluid pressure to account for an open hole leak-off, a density of the fluid, a gas cap volume, or a volume bleed.

In one or more specific aspects of the general embodiment, the well may be a subsea well.

In one or more specific aspects of the general embodiment, the operations may further include determining that the production casing is not cemented in the wellbore; and determining, based on the well configuration, the wellbore operation and the determination that the production casing is not cemented in the wellbore, the characteristic of the well at or adjacent the one or more casing strings and the production tubing during the wellbore operation.

In another general embodiment, a computing system may include one or more memory modules; one or more processors; a graphical user interface; and a well integrity tool stored on one or more of the memory modules. The well integrity tool is operable when executed with the one or more processors to perform operations. The operations include: receiving a selection of a well configuration of a well comprising one or more casing strings and a production tubing extending from adjacent a wellhead of the well to adjacent a bottom of the well; receiving a selection of a wellbore operation performed with the well configuration; determining, based on the well configuration and the wellbore operation, a characteristic of the well at or adjacent the one or more casing strings and the production tubing during the wellbore operation; modifying the well configuration to remove the production tubing; and determining, based on the modified well configuration and the wellbore operation, the characteristic of the well at or adjacent the one or more casing strings during the wellbore operation.

In one or more specific aspects of the general embodiment, the characteristic of the well may be: a temperature of a fluid within an annulus defined between two casing strings; a temperature of a casing string in the one or more casing strings in the wellbore; a pressure of the fluid in the annulus; a thermal property of the well configuration; and a displacement force acting on a casing string in the one or more casing strings in the wellbore.

In one or more specific aspects of the general embodiment, the well integrity tool operations may further include comparing the displacement force with a predetermined static force acting on the casing string; and providing, based on the comparison, an indication that well integrity of the well is compromised.

In one or more specific aspects of the general embodiment, the static force may include a lock ring rating value. The well integrity tool operations may further include providing, based on the comparison, an indication of a lift-off event of the casing string and providing an indication that the displacement force exceeds the predetermined lock ring rating value.

In one or more specific aspects of the general embodiment, the well integrity tool operations may further include comparing the pressure of the fluid in the annulus with a predetermined range of pressure values and providing, based on the comparison, an indication that well integrity of the well is compromised.

In one or more specific aspects of the general embodiment, the predetermined range of pressure values may include a maximum burst pressure value and a maximum collapse pressure value. The well integrity tool operations may further include providing an indication of one of a casing burst or casing collapse event and providing a graphical indication that the pressure of the fluid in the annulus exceeds one of the maximum burst pressure value or the maximum collapse pressure value.

In one or more specific aspects of the general embodiment, the well integrity tool operations may further include at least one of the following: a maximum burst pressure value of one casing string in between two annuli; a maximum collapse pressure value of the one casing string in between the two annuli; and a value of an annular fluid expansion in one of the two annuli.

In one or more specific aspects of the general embodiment, the well integrity tool operations may further include performing a stress analysis on at least one of a casing string or the production tubing of the well configuration exposed to a thermal event; and determining a temperature deration of the casing string or the production tubing based on the stress analysis.

In one or more specific aspects of the general embodiment, the operation of receiving a selection of a well configuration of a well including one or more casing strings and a production tubing may include: receiving values corresponding to an outer diameter and a length of a first casing string; receiving values corresponding to an outer diameter and a length of a second casing string; receiving a selection of a fluid disposed between the first and second casings; and receiving values corresponding to an outer diameter and a length of the production tubing.

In one or more specific aspects of the general embodiment, the well integrity tool operations may further include receiving values corresponding to a weight and grade of one of the first casing string, the second casing string, or the production tubing; receiving a value corresponding to a depth of a top of a cement column associated with one of the first casing string or the second casing string; and receiving values corresponding to a depth and a type of a packer associated with at least one of the first casing string, the second casing string, and the production tubing.

In one or more specific aspects of the general embodiment, the well integrity tool operations may further include receiving values corresponding to a thermal and mechanical properties of one of the first casing string, the second casing string, the production tubing, cement and formation surrounding the wellbore.

In one or more specific aspects of the general embodiment, one of the first casing string or second casing string may include a production casing extending from adjacent the wellhead of the well to adjacent the bottom of the well.

In one or more specific aspects of the general embodiment, the wellbore operation includes a production operation of a hydrocarbon from a subterranean zone through the wellbore. The well integrity tool operations may further include receiving an identification of the hydrocarbon; receiving a value of a rate of production of the hydrocarbon through the wellbore; and receiving an identification of a thermal-flow calculation mode, a steady state condition of the production operation, and a transient condition of the production operation.

In one or more specific aspects of the general embodiment, the well integrity tool operations may further include receiving a value of a hydrostatic pressure of the hydrocarbon at or near the subterranean zone; and receiving a value of a temperature of the hydrocarbon at or near the subterranean zone.

In one or more specific aspects of the general embodiment, the wellbore operation may include an operation for displacing a volume of drilling mud in the annulus with a volume of seawater. The operation of receiving a selection of a wellbore operation performed with the well configuration may include receiving a value of a flowrate of the seawater into the annulus; receiving a value of a temperature of the seawater; and receiving an identification of a thermal-flow calculation mode, a steady state condition of the displacement operation, and a transient condition of the displacement operation.

In one or more specific aspects of the general embodiment, the well integrity tool operations may further include determining an annular fluid expansion pressure of a fluid between two annuli; modifying the determined annular fluid pressure to account for an open hole leak-off, a density of the fluid, a gas cap volume, or a volume bleed.

In one or more specific aspects of the general embodiment, the well may be a subsea well.

In one or more specific aspects of the general embodiment, the well integrity tool operations may further include determining that the production casing is not cemented in the wellbore; and determining, based on the well configuration, the wellbore operation and the determination that the production casing is not cemented in the wellbore, the characteristic of the well at or adjacent the one or more casing strings and the production tubing during the wellbore operation.

Additional aspects may include the following:

In a first aspect, a well integrity tool may perform operations including: receiving a selection of a well configuration of a well comprising one or more casing strings but without a production tubing; receiving a selection of a wellbore operation performed with the well configuration; and determining, based on the well configuration and the wellbore operation, the characteristic of the well at or adjacent the one or more casing strings during the wellbore operation.

In a second aspect according any of the preceding aspects, the well integrity tool may further perform operations including: determining, based on the well configuration having a production tubing and the wellbore operation, a characteristic of the well at or adjacent the one or more casing strings and the production tubing during the wellbore operation.

In a third aspect according any of the preceding aspects, the well integrity tool may further perform operations including: modifying the well configuration with the production tubing to remove the production tubing.

In a fourth aspect according any of the preceding aspects, the well integrity tool may further perform operations including: determining a temperature of a fluid within an annulus defined between two casing strings.

In a fifth aspect according any of the preceding aspects, the well integrity tool may further perform operations including: determining a temperature of a casing string in the one or more casing strings in the wellbore.

In a sixth aspect according any of the preceding aspects, the well integrity tool may further perform operations including: determining a pressure of the fluid in the annulus.

In a seventh aspect according any of the preceding aspects, the well integrity tool may further perform operations including: determining a thermal property of the well configuration.

In a eighth aspect according any of the preceding aspects, the well integrity tool may further perform operations including: determining a displacement force acting on a casing string in the one or more casing strings in the wellbore.

In a ninth aspect according any of the preceding aspects, the well integrity tool may further perform operations including: comparing the displacement force with a predetermined static force acting on the casing string.

In a tenth aspect according any of the preceding aspects, the well integrity tool may further perform operations including: providing, based on the comparison, an indication that well integrity of the well is compromised.

In a eleventh aspect according any of the preceding aspects, the well integrity tool may further perform operations including: providing an indication that the displacement force exceeds a predetermined lock ring rating value.

In a twelfth aspect according any of the preceding aspects, the well integrity tool may further perform operations including: providing, based on the comparison, an indication of a lift-off event of the casing string.

In a thirteenth aspect according any of the preceding aspects, the well integrity tool may further perform operations including: comparing the pressure of the fluid in the annulus with a predetermined range of pressure values.

In a fourteenth aspect according any of the preceding aspects, the well integrity tool may further perform operations including: providing, based on the comparison, an indication that well integrity of the well is compromised.

In a fifteenth aspect according any of the preceding aspects, the well integrity tool may further perform operations including: providing an indication of one of a casing burst or casing collapse event.

In a sixteenth aspect according any of the preceding aspects, the well integrity tool may further perform operations including: providing a graphical indication that the pressure of the fluid in the annulus exceeds one of a maximum burst pressure value or a maximum collapse pressure value.

In a seventeenth aspect according any of the preceding aspects, the well integrity tool may further perform operations including: providing a maximum burst pressure value of one casing string in between two annuli.

In a eighteenth aspect according any of the preceding aspects, the well integrity tool may further perform operations including: providing a maximum collapse pressure value of the one casing string in between the two annuli.

In a nineteenth aspect according any of the preceding aspects, the well integrity tool may further perform operations including: providing a value of an annular fluid expansion in one of the two annuli.

In a twentieth aspect according any of the preceding aspects, the well integrity tool may further perform operations including: performing a stress analysis on at least one of a casing string or the production tubing of the well configuration exposed to a thermal event.

In a twenty-first aspect according any of the preceding aspects, the well integrity tool may further perform operations including: determining a temperature deration of the casing string or the production tubing based on the stress analysis.

In a twenty-second aspect according any of the preceding aspects, the well integrity tool may further perform operations including: receiving values corresponding to an outer diameter and a length of a first casing string.

In a twenty-third aspect according any of the preceding aspects, the well integrity tool may further perform operations including: receiving values corresponding to an outer diameter and a length of a second casing string.

In a twenty-fourth aspect according any of the preceding aspects, the well integrity tool may further perform operations including: receiving a selection of a fluid disposed between the first and second casings.

In a twenty-fifth aspect according any of the preceding aspects, the well integrity tool may further perform operations including: receiving values corresponding to an outer diameter and a length of the production tubing.

In a twenty-sixth aspect according any of the preceding aspects, the well integrity tool may further perform operations including: receiving values corresponding to a weight and grade of one of the first casing string, the second casing string, or the production tubing.

In a twenty-seventh aspect according any of the preceding aspects, the well integrity tool may further perform operations including: receiving a value corresponding to a depth of a top of a cement column associated with one of the first casing string or the second casing string.

In a twenty-eighth aspect according any of the preceding aspects, the well integrity tool may further perform operations including: receiving values corresponding to a depth and a type of a packer associated with at least one of the first casing string, the second casing string, and the production tubing.

In a twenty-ninth aspect according any of the preceding aspects, the well integrity tool may further perform operations including: receiving values corresponding to a thermal and mechanical properties of one of the first casing string, the second casing string, the production tubing, cement and formation surrounding the wellbore.

In a thirtieth aspect according any of the preceding aspects, the well integrity tool may further perform operations including: receiving an identification of a hydrocarbon to be produced in a production operation.

In a thirty-first aspect according any of the preceding aspects, the well integrity tool may further perform operations including: receiving a value of a rate of production of the hydrocarbon through the wellbore.

In a thirty-second aspect according any of the preceding aspects, the well integrity tool may further perform operations including: receiving an identification of a thermal-flow calculation mode, a steady state condition of the production operation, and a transient condition of the production operation.

In a thirty-third aspect according any of the preceding aspects, the well integrity tool may further perform operations including: receiving a value of a hydrostatic pressure of the hydrocarbon at or near the subterranean zone.

In a thirty-fourth aspect according any of the preceding aspects, the well integrity tool may further perform operations including: receiving a value of a temperature of the hydrocarbon at or near the subterranean zone.

In a thirty-fifth aspect according any of the preceding aspects, the well integrity tool may further perform operations including: receiving a value of a flowrate of seawater into an annulus of the well configuration in a nonproduction operation.

In a thirty-sixth aspect according any of the preceding aspects, the well integrity tool may further perform operations including: receiving a value of a temperature of the seawater.

In a thirty-seventh aspect according any of the preceding aspects, the well integrity tool may further perform operations including: receiving an identification of a thermal-flow calculation mode, a steady state condition of the displacement operation, and a transient condition of the displacement operation.

In a thirty-eighth aspect according any of the preceding aspects, the well integrity tool may further perform operations including: determining an annular fluid expansion pressure of a fluid between two annuli.

In a thirty-ninth aspect according any of the preceding aspects, the well integrity tool may further perform operations including: modifying the determined annular fluid pressure to account for an open hole leak-off, a density of the fluid, a gas cap volume, or a volume bleed.

In a fortieth aspect according any of the preceding aspects, the well integrity tool may further perform operations including: determining that the production casing is not cemented in the wellbore.

In a forty-first aspect according any of the preceding aspects, the well integrity tool may further perform operations including: determining, based on the well configuration, the wellbore operation and the determination that the production casing is not cemented in the wellbore, the characteristic of the well at or adjacent the one or more casing strings and the production tubing during the wellbore operation.

FIG. 1 illustrates an example well system 10 in a deepwater subsea environment. In some embodiments, the well integrity tool according to the present disclosure may be utilized to determine and/or predict well integrity of the well system 10 before it is completed, during construction, and/or after complete construction. A semi-submersible platform 12 is centered over a pair of submerged oil and gas formations 14, 16 located below a sea floor 18. A subsea conduit 20 extends from a deck 22 of the platform 12 to a wellhead installation 24 including blowout preventers 26. Platform 12 has a hoisting apparatus 28 and a derrick 30 for raising and lowering pipe strings such as a work string 32, casing strings, liners, and other tubings. A wellbore 34 extends through the various earth strata including formations 14, 16. A casing 36 is cemented within wellbore 34 by cement 38.

Even though FIG. 1 depicts a vertical well, well system 10 can also include wellbores having other directional orientations such as deviated wells, inclined wells or horizontal wells. Also, even though FIG. 1 depicts an offshore operation, the well integrity tool of the present disclosure may be utilized to determine and/or predict well integrity of wells planned for or constructed at onshore locations. Also, even though FIG. 1 depicts two formations, the well integrity tool may be utilized to determine and/or predict well integrity in well configurations constructed through any number of formations.

Figure 2:
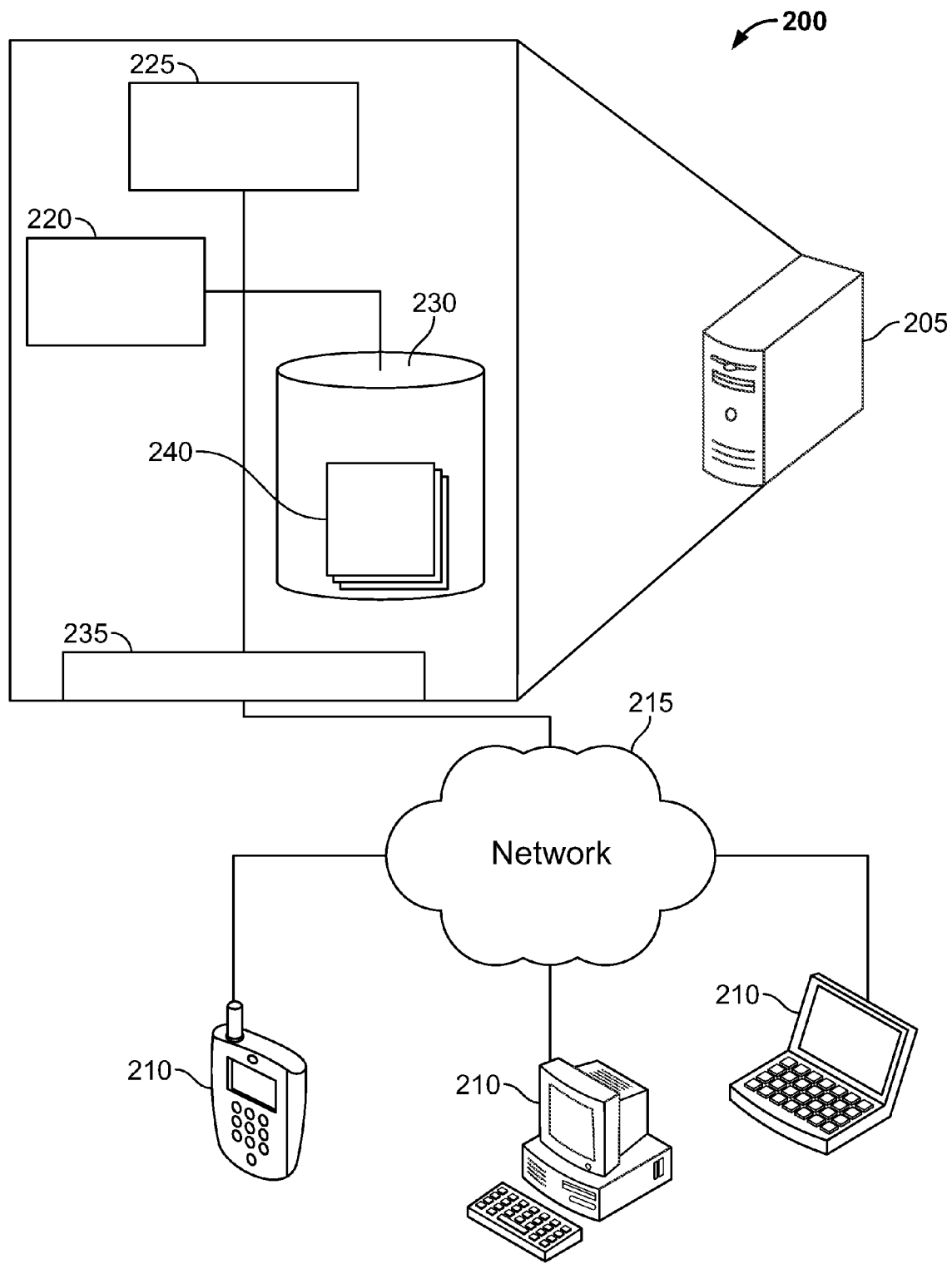
FIG. 2 illustrates an example system including a well integrity tool for determining well integrity of a well configuration.

FIG. 2 illustrates an example system 200 including a well integrity tool 225 for determining well integrity of a well configuration, such as, for example, the well configuration of well system 10. The illustrated system 200 can be a part of the system 10 in FIG. 1, such as on the rig 12, or a portion is on the rig 12 (e.g., clients) and a portion at a remote location. In some other embodiments, all of system 200 is at a remote location but used to determine well integrity of the system 10 before, during, or after construction of the system 10. The system 200 (used interchangeable with "environment 200") includes or is communicably coupled with server 205 and one or more clients 210, at least some of which communicate across network 215. In general, the system 200 depicts an example configuration capable of providing stateful execution of stateless applications in a substantially transparent way, as well as dynamically determining the particular application's mode of operation in response to requests from its clients 210.

In general, the server 205 is any server that stores one or more hosted well integrity tools 225, where at least a portion of the hosted well integrity tools 225 are executed via requests and responses sent to users or clients within and communicably coupled to the system 200. In some instances, the server 205 may store a plurality of various hosted well integrity tools 225, while in other instances, the server 205 may be a dedicated server meant to store and execute only a single hosted well integrity tool 225. In some instances, the server 205 may comprise a web server, where the hosted well integrity tools 225 represent one or more web-based applications accessed and executed via network 215 by the clients 210 of the system to perform the programmed tasks or operations of the hosted well integrity tool 225.

At a high level, the server 205 comprises an electronic computing device operable to receive, transmit, process, store, or manage data and information associated with the system 200. In addition to requests from the external clients 210, requests associated with the hosted well integrity tools 225 may also be sent from internal users, external or third-party customers, other automated applications, as well as any other appropriate entities, individuals, systems, or computers. As used in the present disclosure, the term "computer" is intended to encompass any suitable processing device. For example, although FIG. 2 illustrates a single server 205, system 200 can be implemented using two or more servers 205, as well as computers other than servers, including a server pool. Indeed, server 205 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 205 may be adapted to execute any operating system, including Linux, UNIX, Windows, Mac OS, or any other suitable operating system or system environment such as Citrix.

In the present implementation, and as shown in FIG. 2, the server 205 includes a processor 220, an interface 235, and a memory 230 storing one or more well configuration files 240. The interface 235 is used by the server 205 for communicating with other systems in a client-server or other distributed environment (including within environment of system 200) connected to the network 215 (e.g., client(s) 210, as well as other systems communicably coupled to the network 215). Generally, the interface 235 comprises logic encoded in software and/or hardware in a suitable combination and operable to communicate with the network 215. More specifically, the interface 235 may comprise software supporting one or more communication protocols associated with communications such that the network 215 or interface's hardware is operable to communicate physical signals within and outside of the illustrated environment of system 200.

Generally, the network 215 facilitates wireless or wireline communications between the components of the system 200 (i.e., between the server 205 and the client(s) 210), as well as with any other local or remote computer, such as additional clients, servers, or other devices communicably coupled to network 215 but not illustrated in FIG. 2. The network 215 is illustrated as a single network in FIG. 2, but may be a continuous or discontinuous network without departing from the scope of this disclosure, so long as at least a portion of the network 215 may facilitate communications between senders and recipients. The network 215 may be all or a portion of an enterprise or secured network, while in another instance at least a portion of the network 215 may represent a connection to the Internet. In some instances, a portion of the network 215 may be a virtual private network (VPN), such as, for example, the connection between the client 210 and the server 205.

Further, all or a portion of the network 215 can comprise either a wireline or wireless link. Example wireless links may include 802.11a/b/g/n, 802.20, WiMax, and/or any other appropriate wireless link. In other words, the network 215 encompasses any internal or external network, networks, sub-network, or combination thereof operable to facilitate communications between various computing components inside and outside the illustrated environment of the system 200. The network 215 may communicate, for example, Internet Protocol (IP) packets, Frame Relay frames, Asynchronous Transfer Mode (ATM) cells, voice, video, data, and other suitable information between network addresses. The network 215 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 2, server 205 includes a processor 220. Although illustrated as a single processor 220 in FIG. 2, two or more processors may be used according to particular needs, desires, or particular embodiments of the system 200. Each processor 220 may be a central processing unit (CPU), a blade, an application specific integrated circuit (ASIC), a field-programmable gate array (FPGA), or another suitable component. Generally, the processor 220 executes instructions and manipulates data to perform the operations of server 205 and, specifically, the one or more well integrity tools 225. Specifically, the server's processor 220 executes the functionality required to receive and respond to requests from the client(s) 210 and their respective client applications, as well as the functionality required to perform the other operations of the hosted well integrity tool 225. Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including Fortran, C, C++, Java, Visual Basic, assembler, Perl, any suitable version of 4GL, as well as others. It will be understood that while portions of the software illustrated in FIG. 2 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated system 200, processor 220 executes one or more hosted well integrity tools 225 on the server 205.

At a high level, each of the one or more hosted well integrity tools 225 is any application, program, module, process, or other software that may execute, change, delete, generate, or otherwise manage information according to the present disclosure, particularly in response to and in connection with one or more requests received from the illustrated clients 210 and their associated client applications. In certain cases, only one hosted well integrity tool 225 may be located at a particular server 205. In others, a plurality of related and/or unrelated hosted well integrity tools 225 may be stored at a single server 205, or located across a plurality of other servers 205, as well. In certain cases, environment 200 may implement a composite hosted well integrity tool 225. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, the hosted well integrity tools 225 may represent web-based applications accessed and executed by remote clients 210 or client applications via the network 215 (e.g., through the Internet). Further, while illustrated as internal to server 205, one or more processes associated with a particular hosted well integrity tool 225 may be stored, referenced, or executed remotely. For example, a portion of a particular hosted well integrity tool 225 may be a web service associated with the application that is remotely called, while another portion of the hosted well integrity tool 225 may be an interface object or agent bundled for processing at a remote client 210. Moreover, any or all of the hosted well integrity tools 225 may be a child or sub-module of another software module or enterprise application (not illustrated) without departing from the scope of this disclosure. Still further, portions of the hosted well integrity tool 225 may be executed by a user working directly at server 205, as well as remotely at client 210.

Figure 5C:
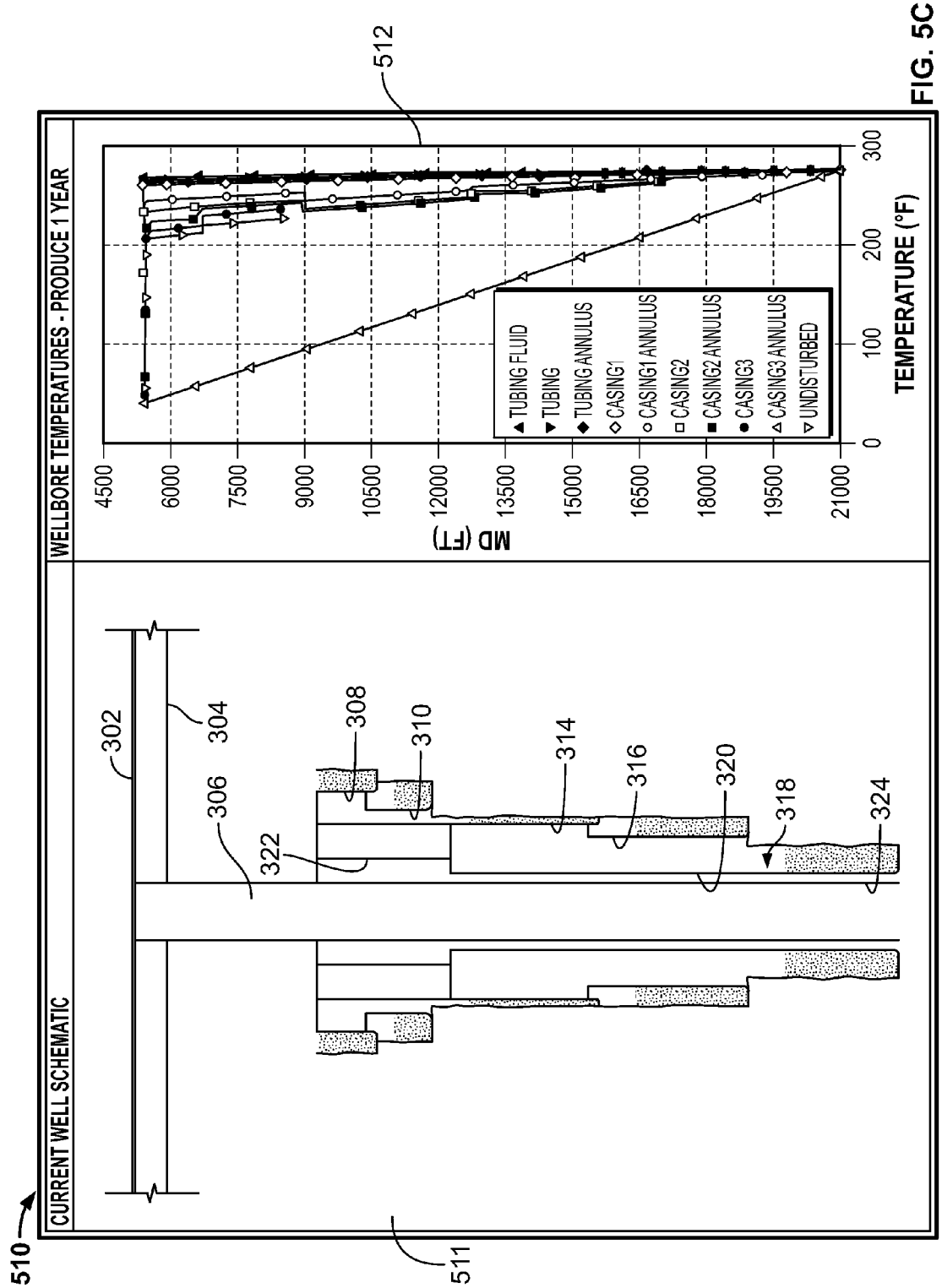

The server 205 also includes memory 230. Memory 230 may include any memory or database module and may take the form of volatile or non-volatile memory including, without limitation, magnetic media, optical media, random access memory (RAM), read-only memory (ROM), removable media, or any other suitable local or remote memory component. Memory 230 may store various objects or data, including the well configuration files 240. In some embodiments, the well configuration files 240 may store, define, and/or save specific data about a particular well configuration or several well configurations. The data, as illustrated in FIG. 5A for example, may include data regarding casing dimensions, casing material, wellbore size, and annulus fluid (i.e., fluid taking up all or part of a space between two casings or other tubulars).

The illustrated environment of FIG. 2 also includes one or more clients 210. Each client 210 may be any computing device operable to connect to or communicate with at least the server 205 and/or via the network 215 using a wireline or wireless connection. Further, each client 210 includes a processor, an interface (e.g. a graphical user interface, or "GUI"), a client application, and a memory. In general, each client 210 comprises an electronic computer device operable to receive, transmit, process, and store any appropriate data associated with the environment 200 of FIG. 2. It will be understood that there may be any number of clients 210 associated with, or external to, environment 200. For example, while illustrated environment 200 includes three clients (210*a*, 210*b*, and 210*c*), alternative implementations of environment 200 may include a single client 210 communicably coupled to the server 205, or any other number suitable to the purposes of the environment 200. Additionally, there may also be one or more additional clients 210 external to the illustrated portion of environment 200 that are capable of interacting with the environment 200 via the network 215. Further, the term "client" and "user" may be used interchangeably as appropriate without departing from the scope of this disclosure. Moreover, while each client 210 is described in terms of being used by a single user, this disclosure contemplates that many users may use one computer, or that one user may use multiple computers.

As used in this disclosure, client 210 is intended to encompass a personal computer, touch screen terminal, workstation, network computer, kiosk, wireless data port, smart phone, personal data assistant (PDA), one or more processors within these or other devices, or any other suitable processing device. For example, each client 210 may comprise a computer that includes an input device, such as a keypad, touch screen, mouse, or other device that can accept user information, and an output device that conveys information associated with the operation of the server 205 (and hosted well integrity tool 225) or the client 210 itself, including digital data, visual information, the client application, or the GUI. Both the input and output device may include fixed or removable storage media such as a magnetic storage media, CD-ROM, or other suitable media to both receive input from and provide output to users of the clients 210 through the display, namely, the GUI. As indicated in FIG. 2, client 210*c* is specifically associated with an administrator of the illustrated environment 200. The administrator 210*c* can modify various settings associated with one or more of the other clients 210, the server 205, the hosted well integrity tool 225, and/or any relevant portion of environment 200. For example, the administrator 210*c* may be able to modify the relevant timeout values associated with each hosted well integrity tool 225, as well as any of the set of hosted application settings, including those associated with the state-type determination module or state information generation module of the hosted well integrity tool 225.

Further, the illustrated client(s) 210 includes a GUI comprising a graphical user interface operable to interface with at least a portion of environment 200 for any suitable purpose, including generating a visual representation of the client application (in some instances, the client's web browser) and the interactions with the hosted well integrity tool 225, including the responses received from the hosted well integrity tool 225 received in response to the requests sent by the client application. The illustrated client 210 also includes a memory that can store all or a portion of the well integrity tool 225 locally as well as through the network 215. Generally, through the GUI, the user is provided with an efficient and user-friendly presentation of data provided by or communicated within the system 200.

The term "graphical user interface," or GUI, may be used in the singular or the plural to describe one or more graphical user interfaces and each of the displays of a particular graphical user interface. Therefore, the GUI can represent any graphical user interface, including but not limited to, a web browser, touch screen, or command line interface (CLI) that processes information in environment 200 and efficiently presents the information results to the user. In general, the GUI may include a plurality of user interface (UI) elements, some or all associated with the client application, such as interactive fields, pull-down lists, and buttons operable by the user at client 210. These and other UI elements may be related to or represent the functions of the client application, as well as other software applications executing at the client 210. In particular, the GUI may be used to present the client-based perspective of the hosted well integrity tool 225, and may be used (as a web browser or using the client application as a web browser) to view and navigate the hosted well integrity tool 225, as well as various web pages located both internal and external to the server, some of which may be associated with the hosted well integrity tool 225. For purposes of the present location, the GUI may be a part of or the entirety of the client application, while also merely a tool for displaying the visual representation of the client and hosted well integrity tool's 225 actions and interactions. In some instances, the GUI and the client application may be used interchangeably, particularly when the client application represents a web browser associated with the hosted well integrity tool 225.

While FIG. 2 is described as containing or being associated with a plurality of elements, not all elements illustrated within environment 200 of FIG. 2 may be utilized in each alternative implementation of the present disclosure. Additionally, one or more of the elements described herein may be located external to environment 200, while in other instances, certain elements may be included within or as a portion of one or more of the other described elements, as well as other elements not described in the illustrated implementation. Further, certain elements illustrated in FIG. 2 may be combined with other components, as well as used for alternative or additional purposes in addition to those purposes described herein.

Figure 3A:
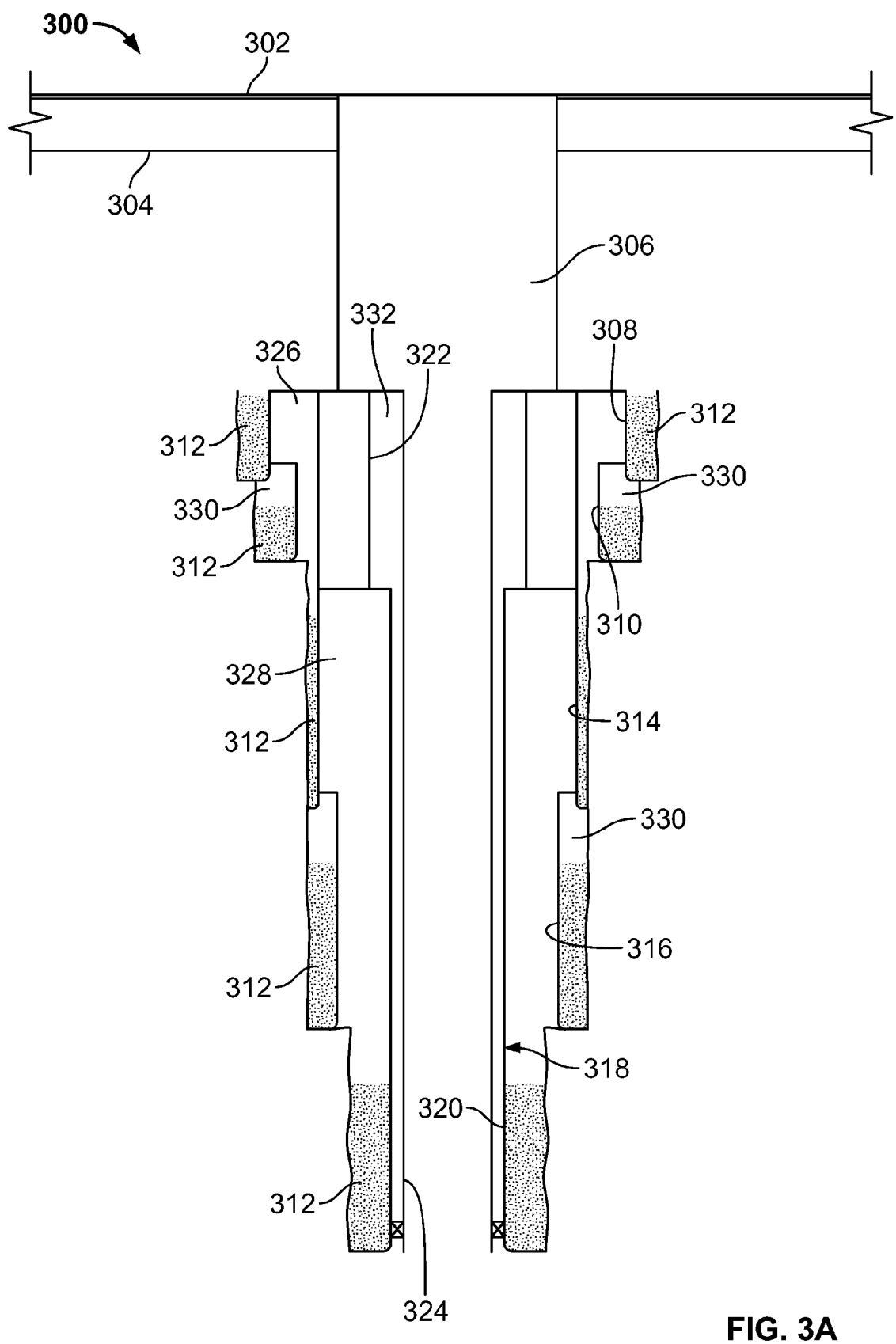
FIG. 3A shows an example well configuration having a production tubing.
Figure 3B:
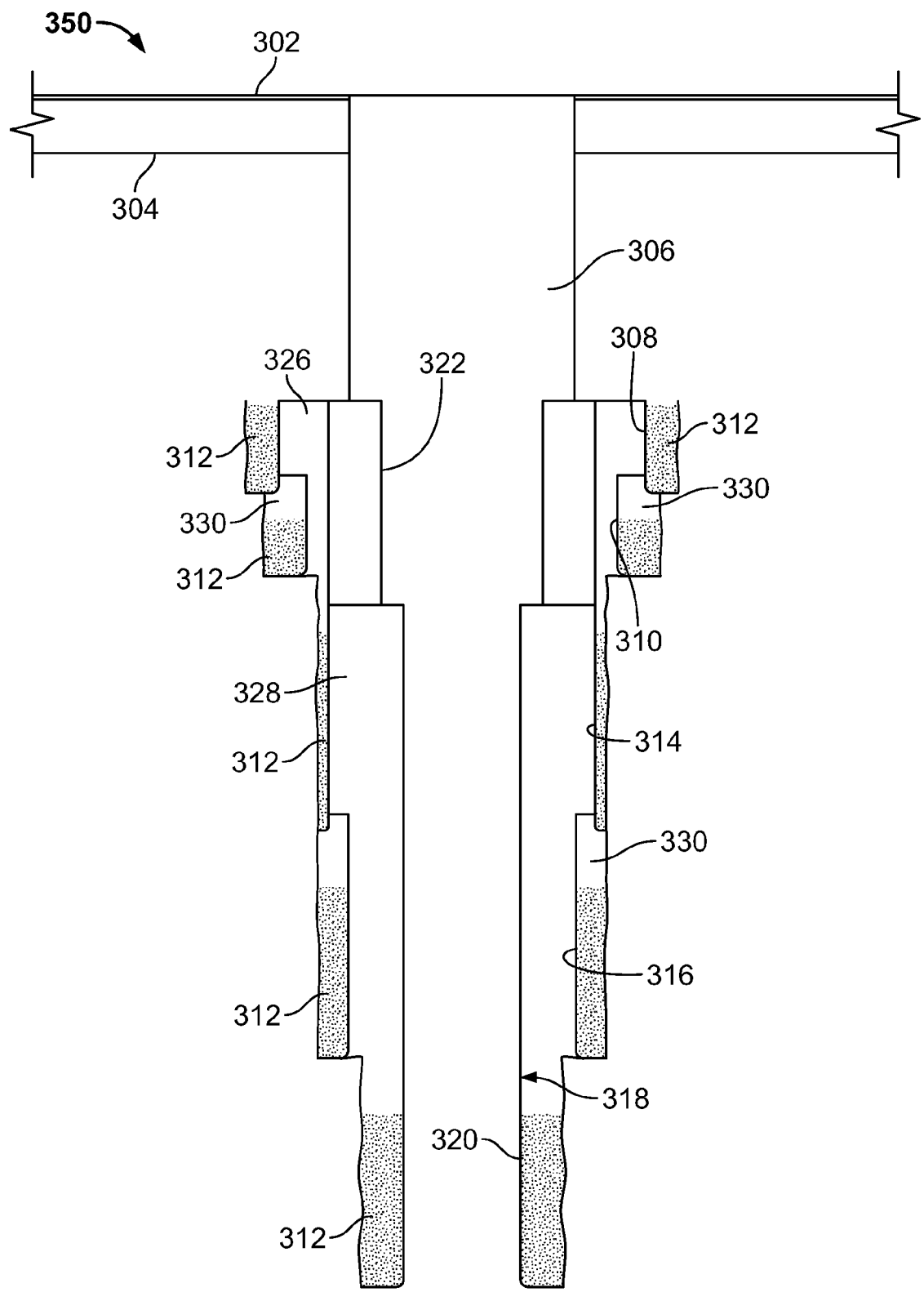
FIG. 3B shows an example well configuration without a production tubing (a "tubingless" well configuration)

FIG. 3A shows an example well configuration 300 having a production tubing, while FIG. 3B shows an example tubingless well configuration 350. First referring to FIG. 3A, the example well configuration 300 is in a deepwater subsea environment with illustrated sea level 302 and sea floor 304. A wellbore 306 has been drilled under the sea floor 304. In some embodiments, such as a typical well configuration in deepwater environment in the Gulf of Mexico, the sea floor can be 5321.5 ft. from the sea level 302; and the wellbore 306 can be more than 20,000 ft. in length, including sections of various diameters. A well can include casings and liners installed in the wellbore 306 to form the well configuration 300.

In the well configuration 300 as shown in FIG. 3A, three sections of casing are illustrated: surface casing 308, intermediate casing 314, and production casing 318. These three sections of casing are secured in place by cement 312 (the shaded portion in FIG. 3A). One or all of the casings 308, 314, and 318 may be large diameter pipe lowered into the wellbore 306 and cemented in place to withstand a variety of forces such as collapse, burst, tensile failure, and chemically aggressive brines. In some aspects, the casings 308, 314, and/or 318 may be casing strings fabricated from tubular joints having male threads on each end. Short-length casing couplings with female threads are used to join the individual joints of casing together, or joints of casing may be fabricated with male threads on one end and female threads on the other. In some aspects, one or more of the casings 308, 314 and 318 may be constructed of plain carbon steel that is heat-treated to varying strengths. Alternatively, the casings 308, 314 and 318 may be specially fabricated of stainless steel, aluminum, titanium, fiberglass and other materials.

In the well configuration 300 as shown in FIG. 3A, two sections of liner are illustrated: surface liner 310 and intermediate liner 316. Each of the liners 310 and 316 may not extend to the top of the wellbore 306 (as illustrated), but instead may anchored or suspended from inside the bottom of the previous casing or casing string. For example, the surface liner 310 hangs from downhole end of the surface casing 308; and the intermediate liner 316 hangs from downhole end of the intermediate casing 314. One or all of the liners 310 and 316 may be attached to adjacent casings with liner hangers used to attach or hang liners from the internal wall of a previous casing string.

As shown by the illustrated well configuration 300, the multiple sections of casing and liner form a stepped structure that allows for deep wells to be configured. For example, the surface casing 308 can extend from 5419.9 ft. to 7000 ft., coupled with the surface liner 310 that extends further to 8500 ft. After this upper portion is secured, the intermediate casing 314 can be installed and extends to 13,000 ft., coupled with the intermediate liner 316 that extends further to 17,000 ft. The production casing 318 can subsequently be installed, reaching down to 21,000 ft. A production tubing 324 can then be installed within the production casing 318, reaching the lower portion 320 where the surrounding formation is desired for production. The production tubing 324 is a wellbore tubular used to produce reservoir fluids, usually assembled with other completion components to make up the production string. In general, the production tubing selected for any completion is designed to be compatible with the wellbore geometry, reservoir production characteristics and the reservoir fluids.

The surface casing 308 is attached to a wellhead (not shown), a surface termination of the wellbore 306 that incorporates facilities for installing casing hangers during the well construction phase. The wellhead may also incorporate a means of hanging production tubing and installing a "Christmas tree" and surface flow-control facilities in preparation for the production phase of the well. Between each step of casing and the casing/liner/tubing within, there is a void 330 above the cement 312 and annuli 326, 328, and 332. The annuli 326 and 328 may have significant pressure trapped between casings/liners and/or in the void 330; such may form potential hazardous problems and harm well integrity. Typically the production annulus 332 between 322 and 324 is vented (e.g., open to allow pressurized fluids to escape the annulus 332).

Now referring to FIG. 3B, the illustrated well configuration 350 is similar to that of FIG. 3A except for the lack of the production tubing 324. This configuration reflects a situation in which the well configuration is under construction and the tubing has yet to be installed or production can be performed without production tubing. In this configuration, the problems of significant pressure trapped between casings/liners in the annuli 326 and 328 and/or in the voids 330 still exist and may harm well integrity. A well configuration having a production tubing may experience different well integrity issues relative to a substantially similar well configuration not having a production tubing (i.e., a tubingless configuration with similar or identical parameters for casing strings, liners, well operation, and otherwise). For example, if unexpected production occurs prior to installation of a production tubing, well integrity issues could occur even if they would not occur with the production tubing installed. In addition, different non-production scenarios can have different well integrity issues depending on whether there is a production tubing installed or not.

Figure 4A:
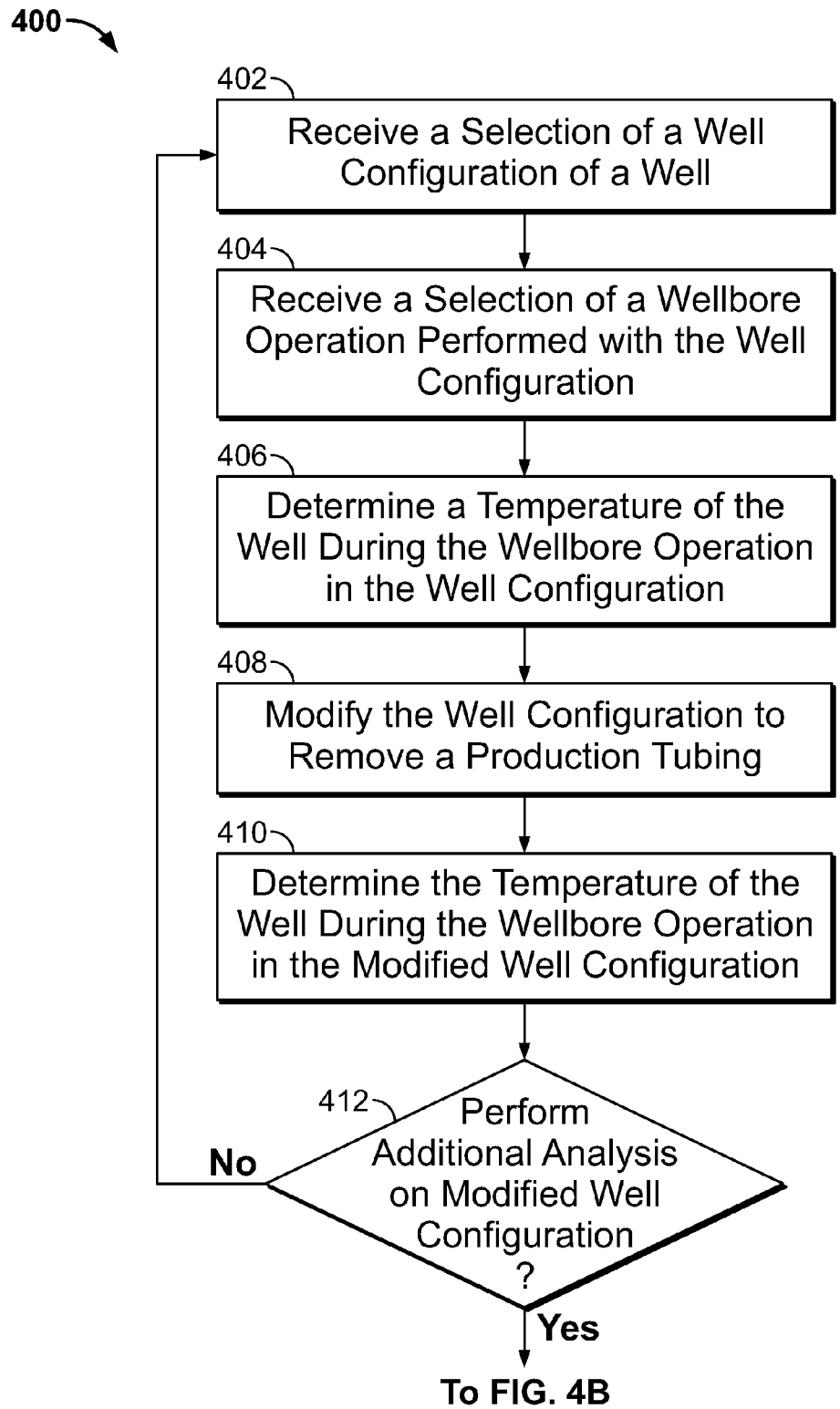
FIGS. 4A-4C illustrate example methods of using a well integrity tool for determining well integrity of a well configuration.
Figure 4B:
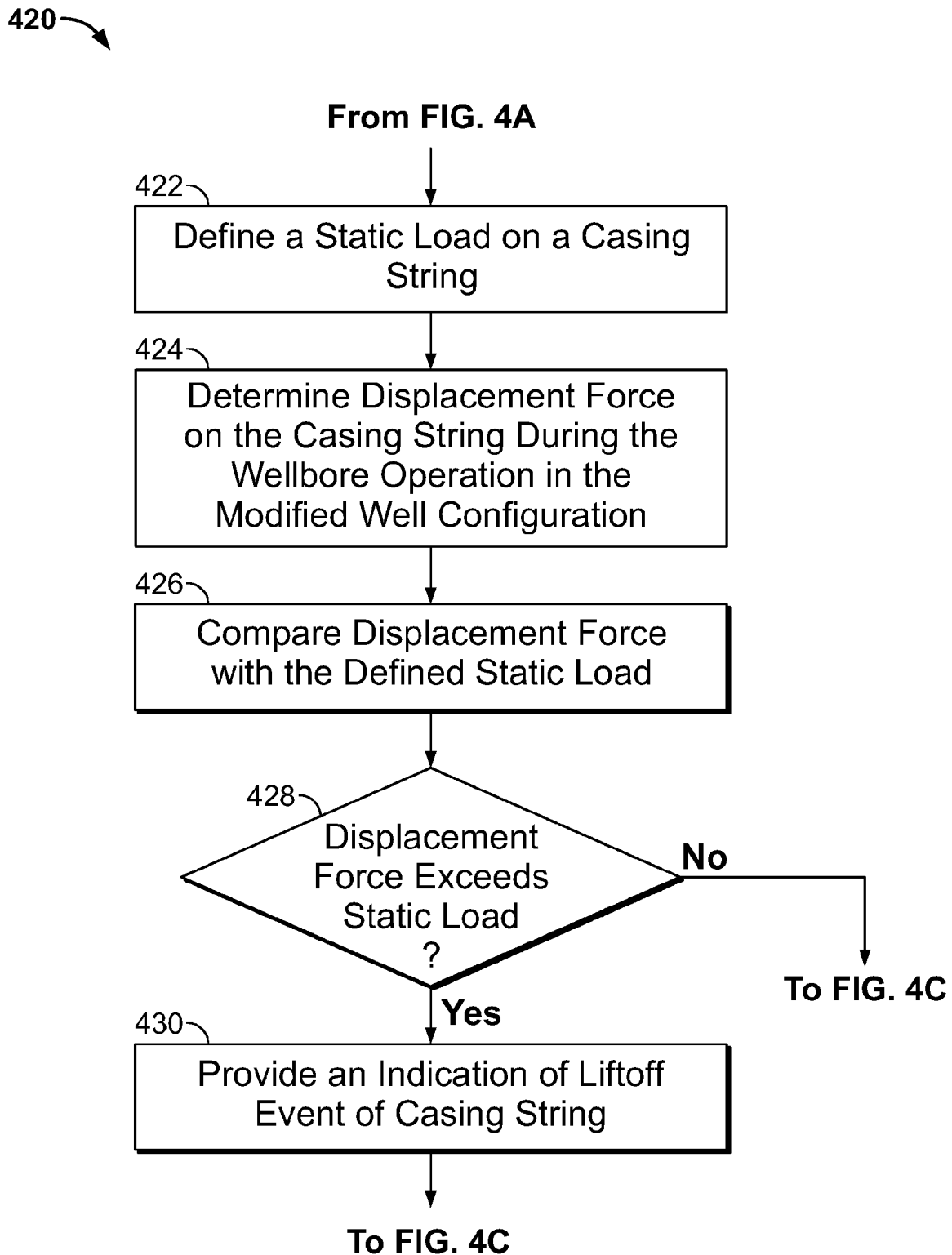
Figure 4C:
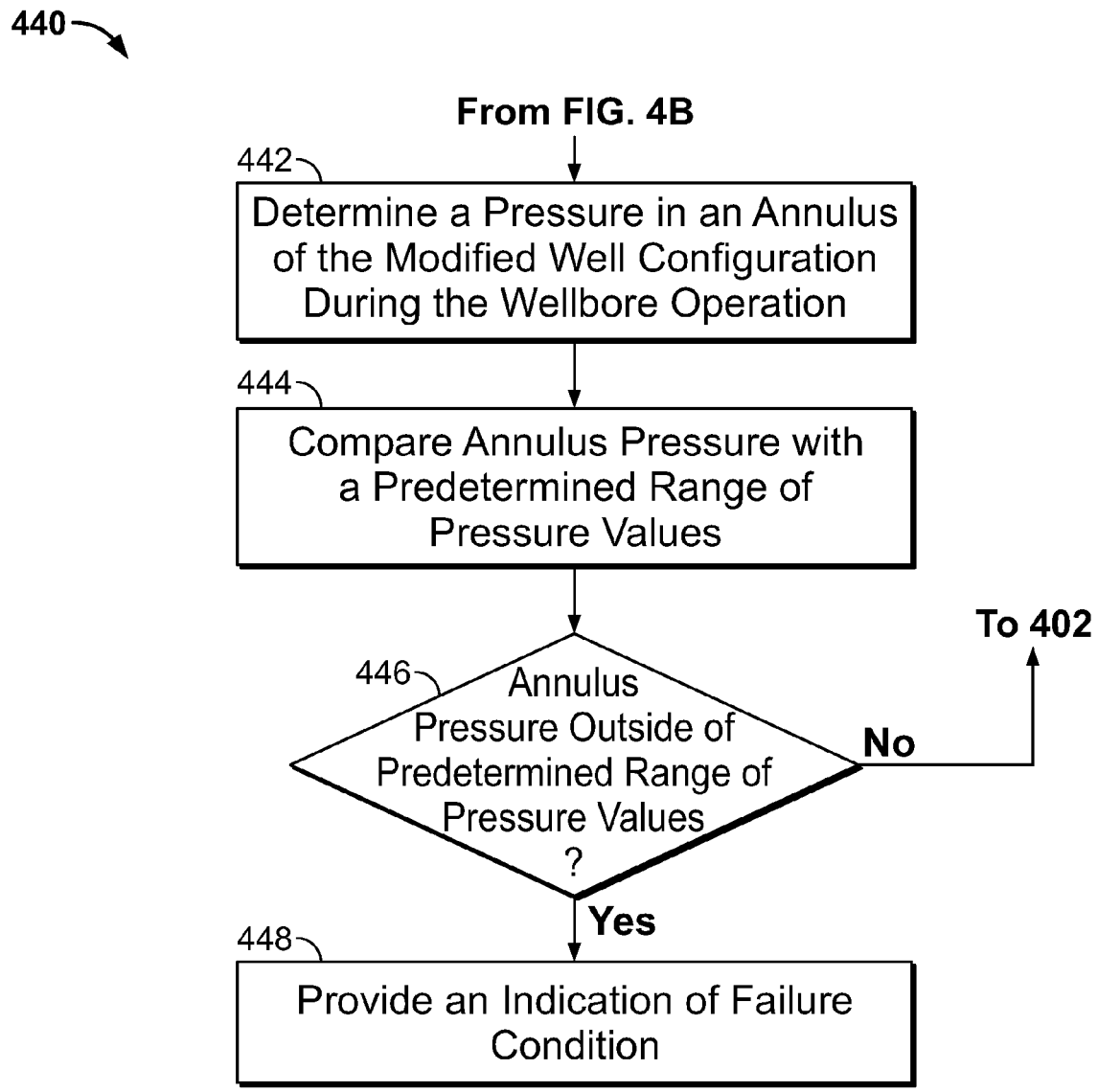

FIGS. 4A-4C illustrate example methods of using a well integrity tool having, for example, the well integrity tool 225 for determining well integrity of a well configuration. First referring to FIG. 4A, the well integrity tool process starts with step 402 where the module receives a selection of configuration of a well. In some embodiments, this step 402 may be accomplished with or via a GUI of the well integrity tool, such as the GUI 500 illustrated in FIG. 5A. The GUI 500 allows users to input basic parameters of the well configuration, for example, depth and geometric values of each section of casing/liner, as well as properties of the annulus fluid. Users may also select a predefined well configuration in GUI 500 and apply the information to the well configuration files 240. In some embodiments, users can define specific portions of a casing, such as the production casing with an upper portion and lower portion. Then the users can save the defined well configuration parameters as a well configuration file 240 for later use. If the well configuration file 240 is selected and loaded by users, then all the parameters are automatically filled in. Similarly, the users can define or select predefined wellbore dimensions, depth or other configuration parameters.

After defining the well configuration, a wellbore operation is selected and/or defined at step 404. In some embodiments, step 404 may be accomplished with or via a GUI such as the GUI 505 illustrated in FIG. 5B. The GUI 505 allows users to select the operating conditions of the well, such as pressure, location, depth, temperature, production rates, duration, or otherwise. Here, as an example, the wellbore operation is defined as a production of oil at the perforations location of 21,000 ft. depth, at a pressure of 15,000 psi, and at an inlet temperature of 275 deg F. The production rate is selected to be 100,000 bbl/D, and the duration is one year.

Similarly, GUI 530 in FIG. 5G and GUI 535 in FIG. 5H also allow users to define wellbore operation. Users can save all the parameters into a well configuration file and load the file to recall all the predefined values. For example, GUI 530 can be a user interface to receive wellbore operation data on a nonproduction operation, such as an operation flowing seawater into an annulus between a production casing and wellbore to flush drilling mud. In some embodiments, FIG. 5G allows users to select/define the geometry of the well configuration, flow path, type of operation, type of fluid, and operation conditions such as transient conditions and prior operation conditions. As an example, FIG. 5H shows the parameters for seawater displacement. The parameters of the production casing are selected to be at the perforations under a pressure of 9400 psi, 21000 ft. perforation depth, at an inlet temperature of 175 deg F., and at a production rate of 10286 bbl/D. The operation duration is selected to be 30 minutes or an alternative volume value can be defined.

At step 406, a temperature of the well at various locations (e.g., depths) during the wellbore operation in the well configuration is determined by the well integrity tool. In some embodiments, the temperature(s) may be presented to the user with or via a GUI of the well integrity tool, such as the GUI 510 illustrated in FIG. 5C. GUI 510 includes GUI 511 that shows the current well schematic (similar to FIG. 3A) and GUI 512 that shows the measurement results of temperature versus depth at different locations and sections of the well configuration.

At the next step 408, the well configuration is modified to remove a production tubing. In some aspects, the user may predefine that the well configuration is tubingless. In other aspects, the user may control the well integrity tool to determine and/or predict the temperature(s) at various locations (e.g., depths) in both a tubingless operation and an operation having a production tubing installed. Thus, the user may receive temperature data of the well in both a normal or typical production operation as well as an "unplanned" wellflow production scenario, such as when hydrocarbons are produced from a subterranean zone into the wellbore prior to the production tubing being installed. The modification of the previously defined and/or selected well configuration to a tubingless well configuration may be accomplished automatically via the well integrity tool or by request of the user of the well integrity tool.

Figure 5D:
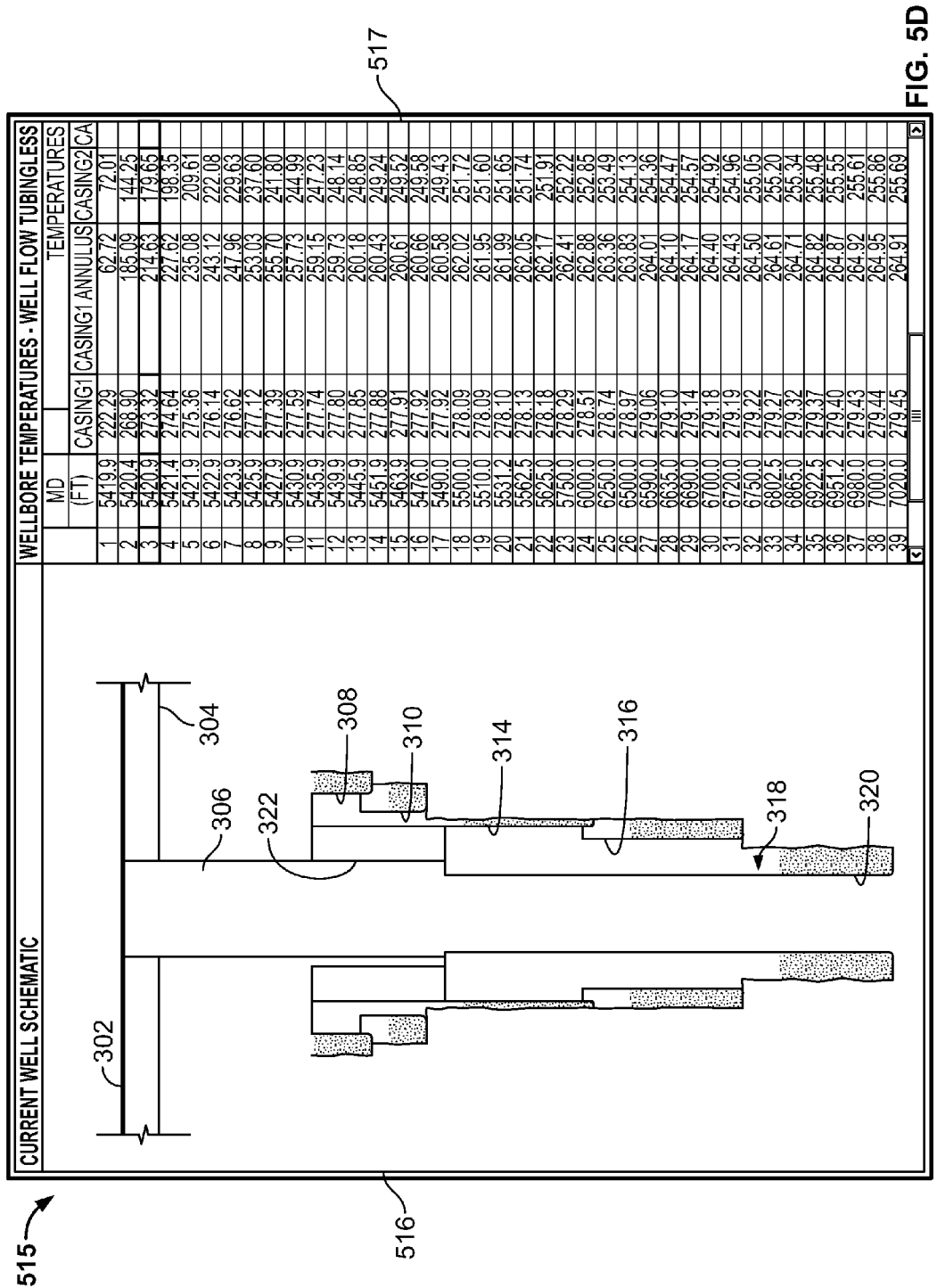

At the following step 410, the temperature of the well at various locations (e.g., depths) during operation in the modified well configuration (e.g., the tubingless configuration) is determined. The operation modeled by the well integrity tool in step 410 may be the same (e.g., exactly or substantially) as the well operation modeled in step 406. In some embodiments, step 410 can be accomplished with or via a GUI such as the GUI 517 illustrated in FIG. 5D or the GUI 540 in FIG. 5I. Both the GUI 517 and GUI 540 show the results of temperature versus depth at different locations and sections of the modified well configuration. GUI 517 may, in some aspects, illustrate the results of temperature versus depth at different locations and sections of the modified well configuration for an unplanned wellflow production scenario.

At step 412, if additional analysis on the modified well configuration needs to be performed, the analysis is carried onto the next step 422 in FIG. 4B; otherwise one cycle of analysis is complete and the process returns to step 402.

At step 422, a static load on one or more of the casing strings in the well configuration is defined through or in the well integrity tool. For example, in some aspects of the well integrity tool, the user may define and/or select a static load to be applied to the well configuration by a lock-ring. The lock-ring, for instance, may substantially prevent vertical displacement of the production casing at the wellhead when energized. The defined static load, therefore, may be substantially equal to the lock-ring load rating in pounds. The user may define a positive static load (e.g., load acting in the downhole direction on the casing string) or, alternatively, may define a static load of zero, indicating, for instance, that the lock-ring is not energized.

Next, in step 424, the well integrity tool determines a displacement force on the casing string (e.g., a slip contact force) during the wellbore operation in the modified well configuration (i.e., the tubingless well configuration). Alternatively or additionally, the well integrity tool may determine a displacement force on the casing string (e.g., a slip contact force) during the wellbore operation in the modified well configuration having a production tubing. In step 426, the determined displacement force is compared against the static load defined on the casing string (e.g., the lock ring value). In step 428, the well integrity tool determines if the displacement force exceeds the static load based on the comparison in step 426. If the displacement load does not exceed the static load (e.g., is not greater than the static load acting the opposite (uphole) direction), then method 420 continues to step 442 of method 440. If the displacement load exceeds the static load, then method 420 continues to step 430, and provides an indication of a well integrity failure event, e.g., a liftoff event.

Figure 5E:
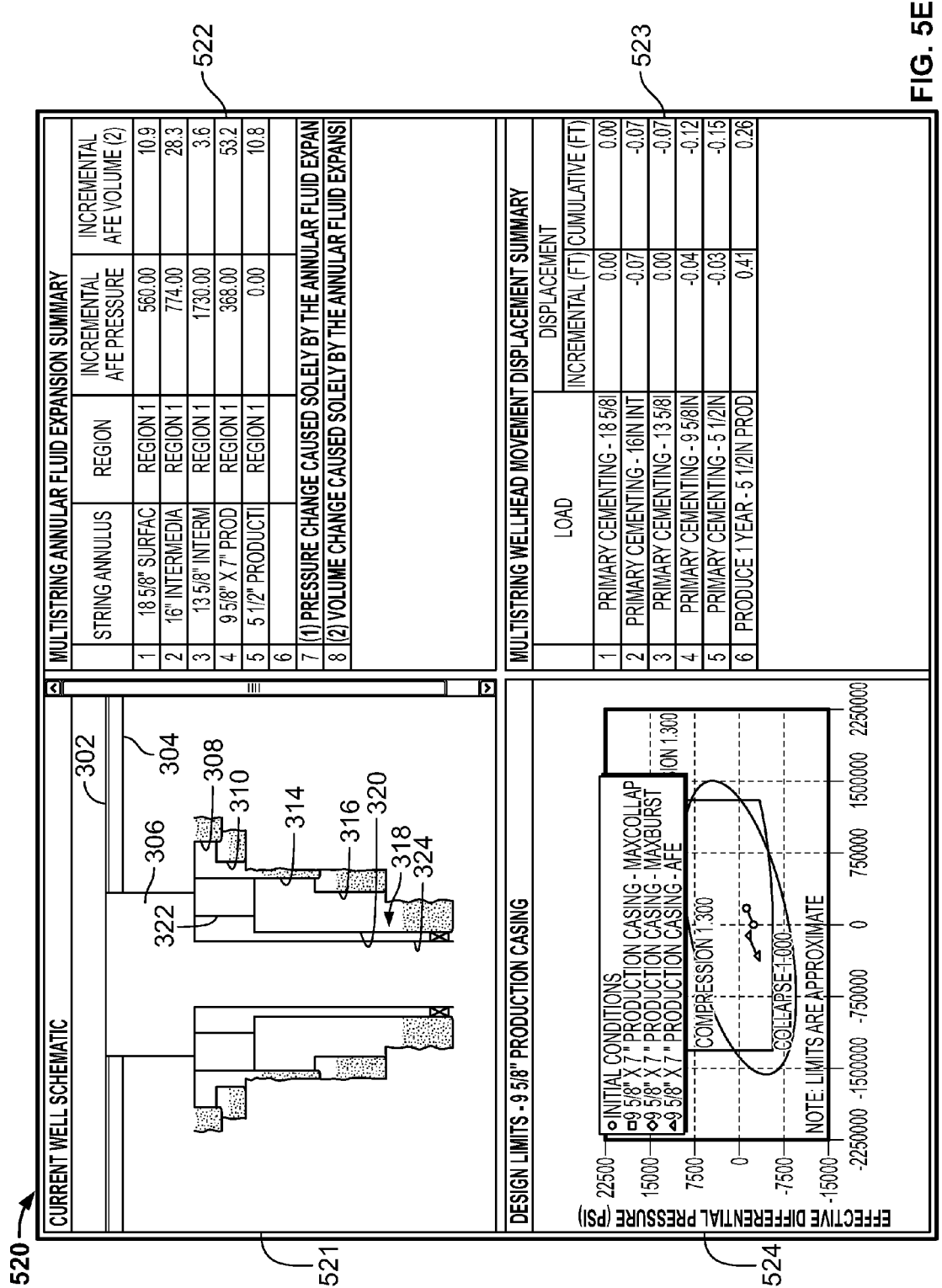

For example, the result of the analysis performed by the well integrity tool in steps 424-430 for the original well configuration may be presented to the user with or via a GUI of the well integrity tool, such as the GUI 520 illustrated in FIG. 5E. GUI window 521 illustrates the well configuration being analyzed, which includes a production tubing 324. GUI window 522 shows trapped annular pressure results during the well production operation. A quick check of how the additional loads generated by these incremental annular fluid expansion (AFE) pressures affects the integrity of the casing strings in the well is addressed through Von Misses triaxial and uni-biaxial stress analysis. GUI window 523 shows multistring wellhead movement displacements, including both incremental displacement by casing and cumulative displacements due to the displacement force. In the example of FIG. 5E, the displacement values show that there is no well integrity failure event (e.g., liftoff) indicated. GUI window 524 shows a graphical representation of the stress analysis and suggests that although additional stress conditions are generated, they fall within the uni-biaxial/triaxial stability design envelopes.

Figure 5F:
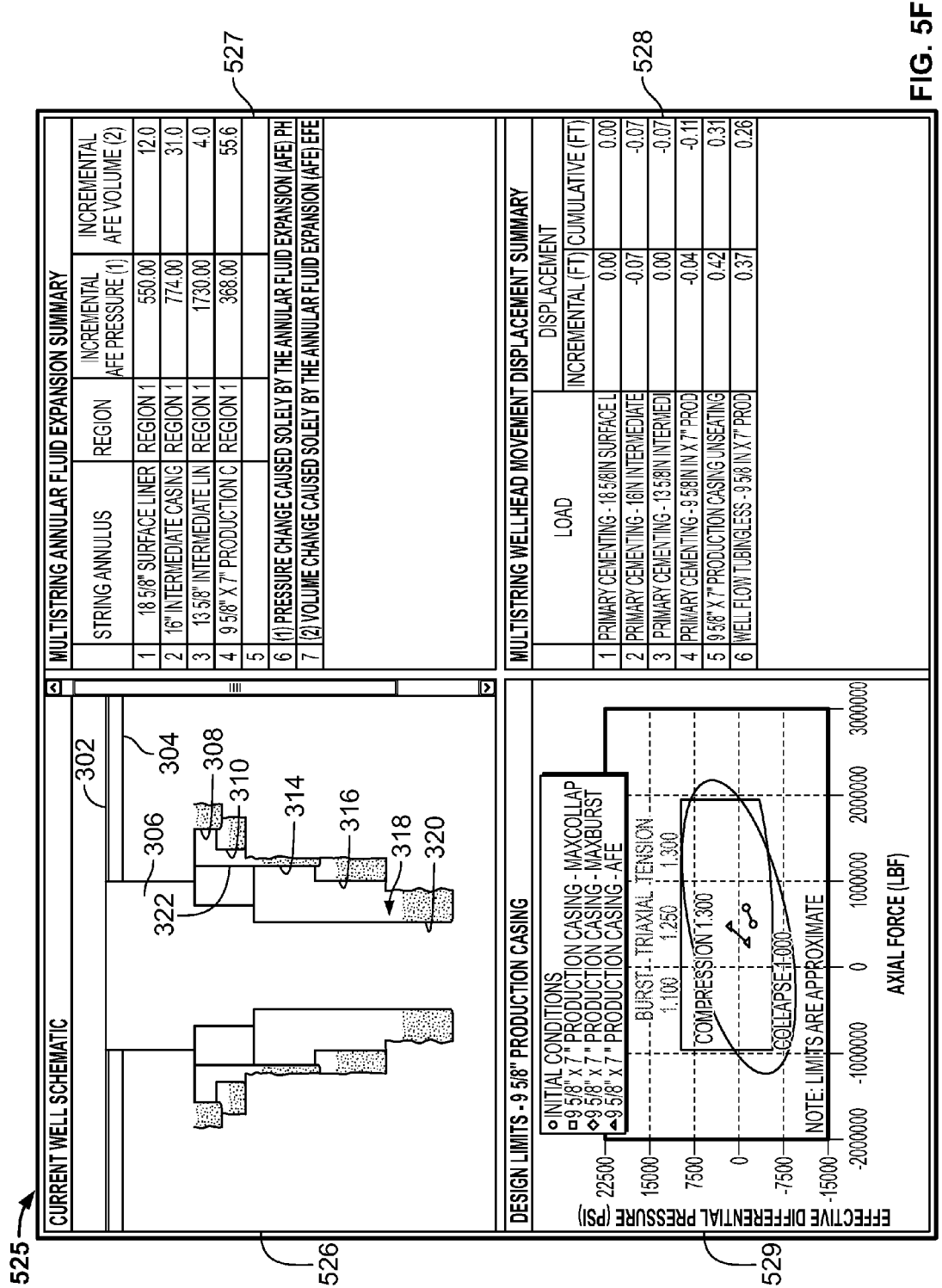
Figure 5G:
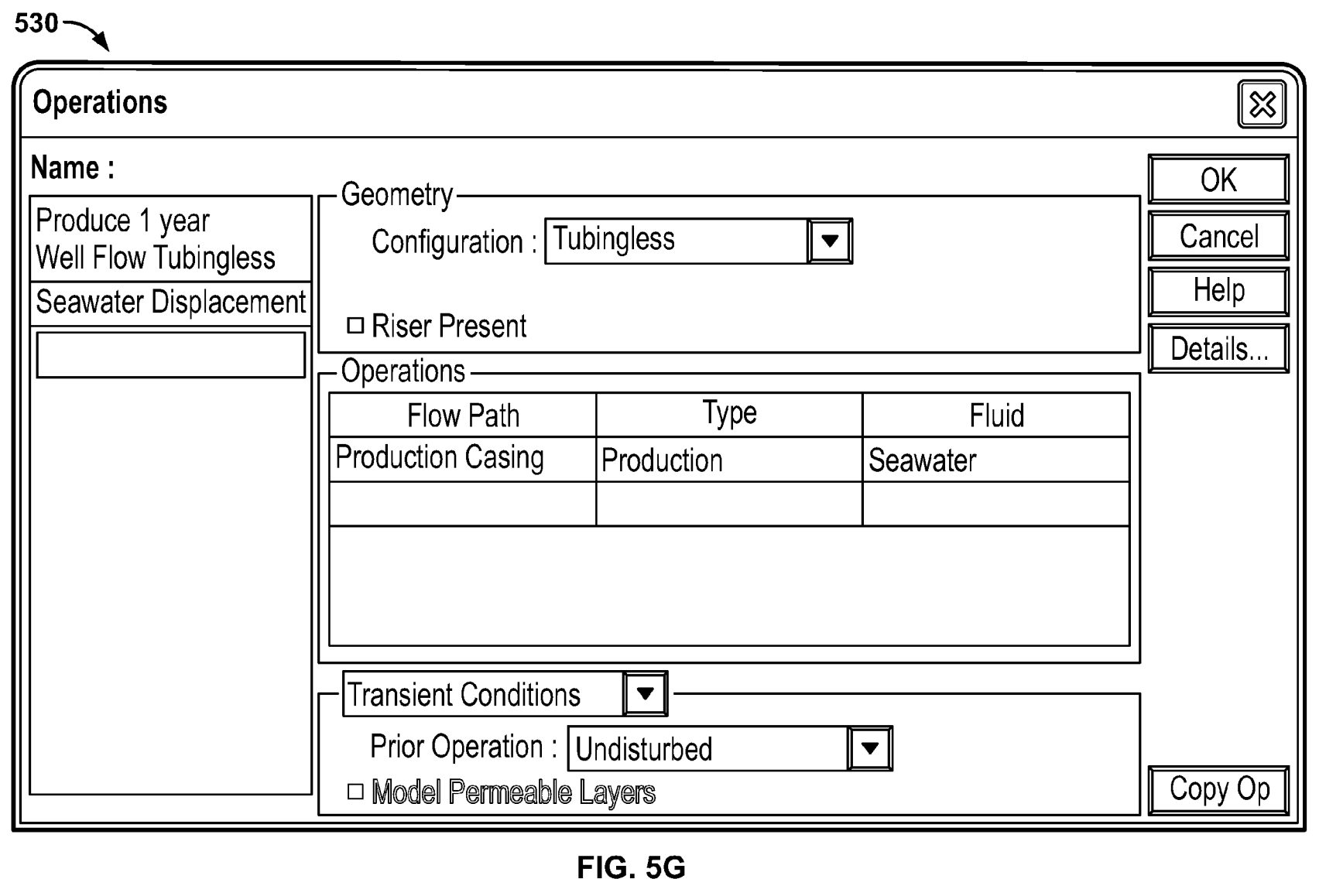

The result of the analysis performed by the well integrity tool in step 424 for the modified well configuration may be presented to the user with or via a GUI of the well integrity tool, such as the GUI 525 illustrated in FIG. 5F. GUI window 526 illustrates the modified well configuration being analyzed, which does not include production tubing 324. GUI window 527 shows trapped annular pressure results during the well production operation in the tubingless configuration. A quick check of how the additional loads generated by these incremental annular fluid expansion (AFE) pressures affects the integrity of the casing strings in the well is addressed through Von Misses triaxial and uni-biaxial stress analysis. GUI window 528 shows multistring wellhead movement displacements, including both incremental displacement by casing and cumulative displacements due to the displacement force. In the example of FIG. 5F, the displacement values show that there is a well integrity failure event (e.g., liftoff) indicated. GUI window 529 shows a graphical representation of the stress analysis and suggests that although additional stress conditions are generated. As illustrated, they fall within the uni-biaxial/triaxial stability design envelopes. Thus, the well integrity tool may provide an indication that a well integrity failure event occurs in the tubingless well configuration during the well operation even though there was no failure event during the well operation at the original (i.e., including a production tubing) well configuration.

The well integrity analysis of the tubingless well configuration (e.g., an unexpected well flow scenario) in reference to trap annular pressure may indicate preselected casing strings are suitable to handle the loading conditions caused by trap annular pressure. But, as illustrated in GUI window 528 the well system itself may not be suitable to handle the redistribution of the axial loads and additional loads caused by this well flow tubingless scenario. This is shown, for example, through the indication that the production casing 318 has unseated. The wellhead movement and the progressive failure analysis in particular predict the possibility of a liftoff event as a consequence of the combination of a critical loading condition and defective and/or improper lock-ring setting. In this example, the production casing unseating from the external string due to the combination of the stress state of the production casing string and the associated loading condition, caused by the thermal expansion. The combination of this loading condition and a defective and/or unenergized lock ring setting triggers a liftoff event of the production casing string.

Continuing to method 440, in step 442, the well integrity tool determines a pressure in an annulus of the modified well configuration during the well operation. In some embodiments, the result of the analysis of step 442 may be presented to the user with or via a GUI of the well integrity tool, such as GUI 520 in FIG. 5E or GUI 525 in FIG. 5F. Description of GUI 520 in FIG. 5E is similar to that discussed at step 422. GUI 525 includes GUI window 526 that shows the current well schematic, GUI window 527 that shows a fluid expansion summary, GUI window 528 that shows a movement displacement summary, and GUI window 529 that shows the effective differential pressure versus axial forces. The analysis of well head movement and progressive failure analysis risk during the initial well construction events and tubingless wellflow event—indicates a liftoff unseating event of string 320.

At step 444, annulus pressure is compared with a predetermined range of pressure values. In the following step 446, if the annulus pressure is outside of a predetermined range of pressure values (string burst/collapse ratings), the program continues to and ends with step 448, where an indication of a failure event of a casing string is provided. Otherwise, the method may return to step 402. A failure event may include, for example, a casing collapse, a casing burst, or other failure event. In some example embodiments, step 448 may be accomplished with or via a GUI of the well integrity tool such as the GUI 520, 525, and/or 545 in FIGS. 5E, 5F, and/or 5J, respectively.

Figure 5I:
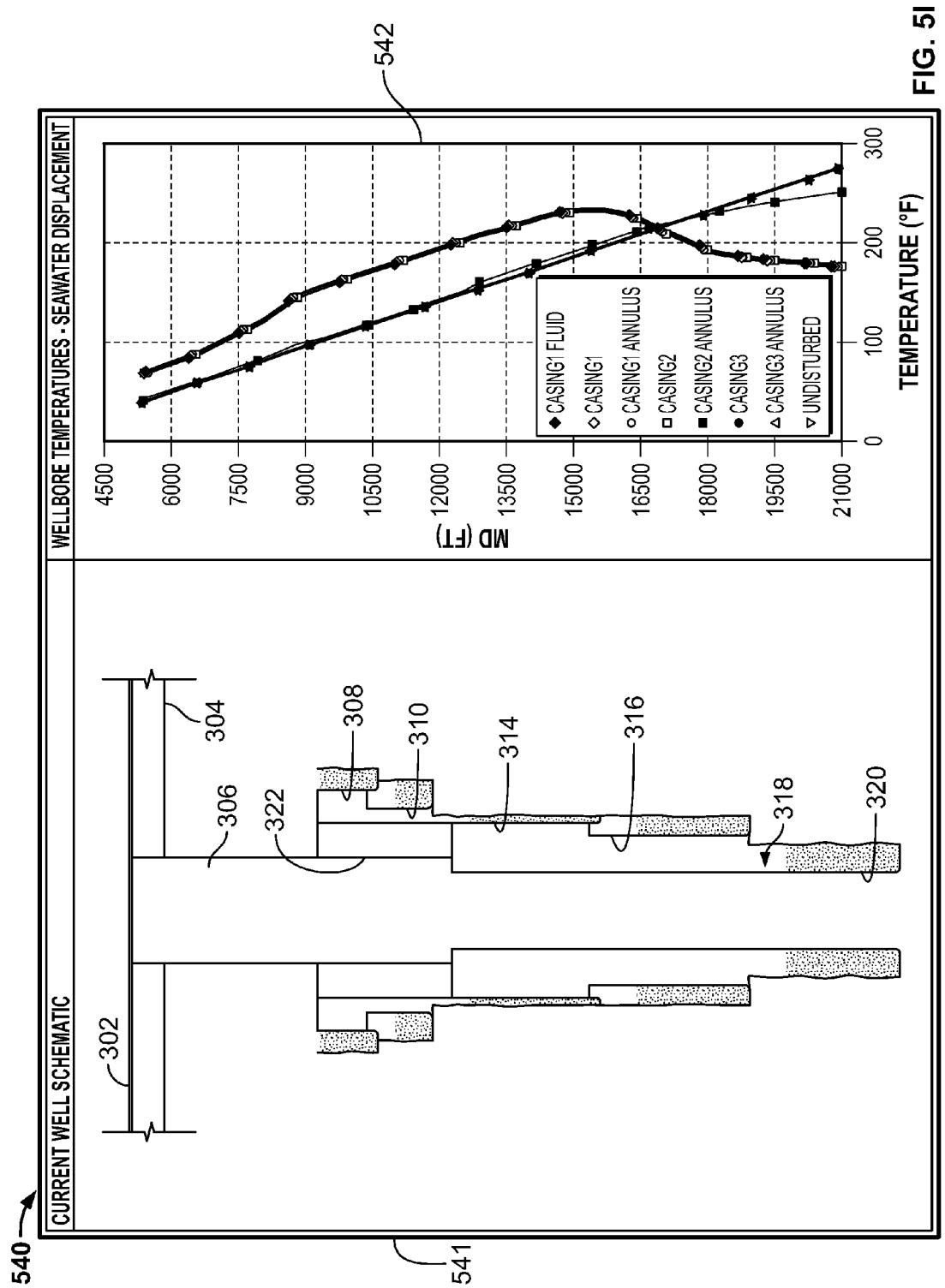

Now referring to FIG. 5I, a GUI 540 showing temperature analysis of the nonproduction event is illustrated. GUI 540 includes GUI window 541 that shows the current well schematic of a tubingless well configuration, and GUI window 542 that shows the measurement results of temperature versus depth at different locations and sections of the well configuration.

Figure 5J:
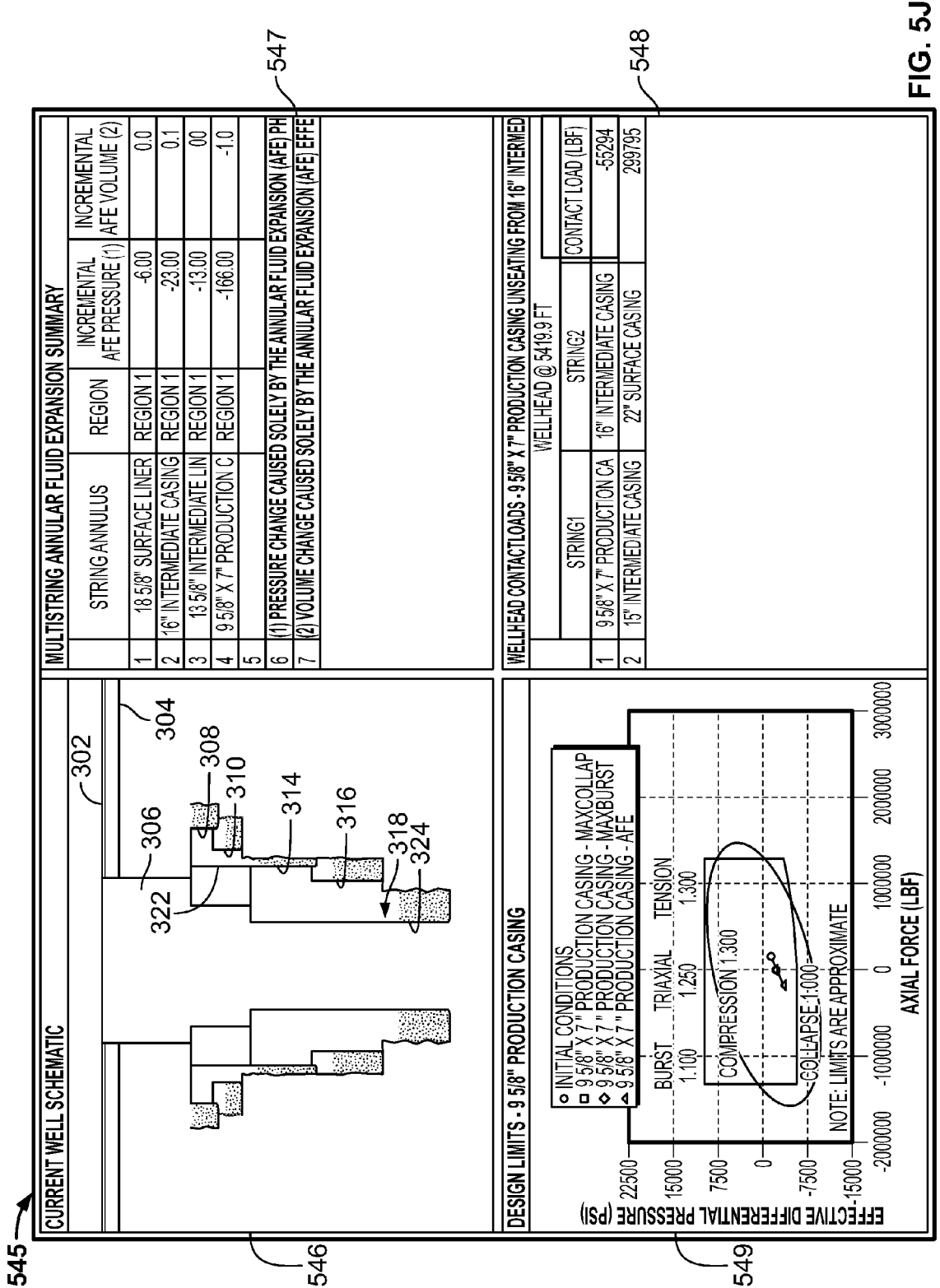

In FIG. 5J, a GUI 545 shows displacement summary, failure analysis and AFE (annular fluid expansion) for the nonproduction event. GUI 545 includes GUI window 546 that shows the current tubingless well schematic, a GUI window 547 that shows an AFE summary (e.g., incremental AFE pressure and volume in between casing strings of the well configuration), a GUI window 548 that shows a contact load summary for a well integrity failure event, and a GUI window 549 that shows the effective differential pressure versus axial forces. As illustrated, GUI window 548 shows there to be a contact load of 55,294 lbf acting upwards on the production casing 318 as it unseats from the intermediate casing 322. In some example embodiments, the indication of a liftoff event can be presented to the user with or via this GUI 545.

Figure 5K:
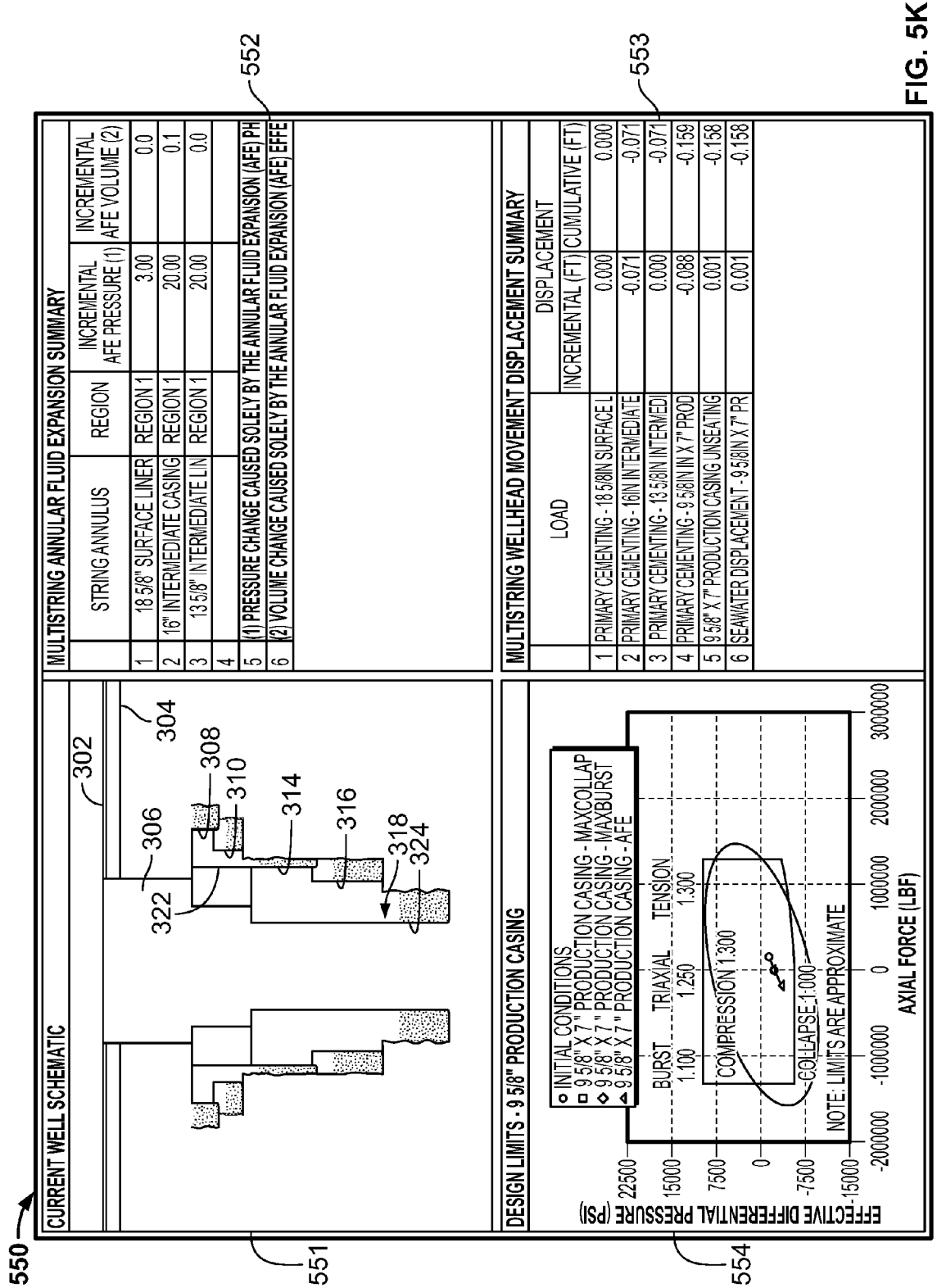

In FIG. 5K, a GUI 550 shows displacement summary, failure analysis and AFE (annular fluid expansion) for the nonproduction event in an uncemented scenario. For instance, in some cases, FIG. 5J may illustrate displacement, failure, and AFE data for the nonproduction event when the production casing 318 is cemented in the wellbore 306 (e.g., having cement installed in the annulus 328). In some situations, however, well integrity analysis results may be difference for an uncemented scenario, when there is little to no cement installed in the annulus 328. The well integrity tool, therefore, may receive a selection from the user indicating that the production casing 318 is not cemented. GUI 550 in FIG. 5K includes GUI window 551 that shows the current tubingless well schematic in the uncemented scenario, a GUI window 552 that shows an AFE summary (e.g., incremental AFE pressure and volume in between casing strings of the well configuration), a GUI window 553 that a movement displacement summary, and a GUI window 554 that shows the effective differential pressure versus axial forces. As illustrated, GUI window 553 shows a well integrity failure event (e.g., a lift-off event) of the production casing 318 of about 0.158 ft. (cumulative displacement) upward. In some example embodiments, the indication of a liftoff event can be presented to the user with or via this GUI 550. The GUIs in FIGS. 5G, 5H, 5I, 5J, and 5K can be used in one or more of methods 400, 420 and 440.

A number of implementations have been described. Nevertheless, it will be understood that various modifications may be made. Further, method(s) 400, 420, and/or 440 may include fewer steps than those illustrated or more steps than those illustrated. In addition, the illustrated steps of method(s) 400, 420, and/or 440 may be performed in the respective orders illustrated or in different orders than that illustrated. As a specific example, methods 420 and 440 may be performed simultaneously (e.g., substantially or otherwise). Other variations in the order of steps are also possible. Accordingly, other implementations are within the scope of the following claims.

What is claimed is:

1. A method performed with a computing system for determining well integrity, the method comprising:
    receiving, based on user interaction with a graphical user interface (GUI), a selection of a well configuration of a well, the selection comprising of one or more casing strings and a production tubing extending from adjacent a wellhead of the well to adjacent a bottom of the well;
    receiving, based on user interaction with the GUI, a selection of a wellbore operation performed with the well configuration;
    determining, based on the well configuration and the wellbore operation, a characteristic of the well at or adjacent the one or more casing strings and the production tubing during the wellbore operation, and displaying the characteristic on the GUI;
    modifying the user-selected well configuration to remove the production tubing; and
    determining, based on the modified well configuration and the wellbore operation, the characteristic of the well at or adjacent the one or more casing strings during the wellbore operation, and displaying the characteristic on the GUI.

2. The method of claim 1, wherein the characteristic comprises at least one of:
    a temperature of a fluid within an annulus defined between two casing strings;
    a temperature of a casing string in the one or more casing strings in the wellbore;
    a pressure of the fluid in the annulus;
    a thermal property of the well configuration; and
    a displacement force acting on a casing string in the one or more casing strings in the wellbore.

3. The method of claim 2, further comprising:
    comparing the displacement force with a predetermined static force acting on the casing string; and
    providing, based on the comparison, an indication that well integrity of the well is compromised.

4. The method of claim 3, wherein the static force comprises a lock ring rating value, the method further comprising:
    providing, based on the comparison, an indication of a lift-off event of the casing string; and
    providing an indication that the displacement force exceeds the lock ring rating value.

5. The method of claim 2, further comprising:
    comparing the pressure of the fluid in the annulus with a predetermined range of pressure values; and
    providing, based on the comparison, an indication that well integrity of the well is compromised.

6. The method of claim 5, wherein the predetermined range of pressure values comprise a maximum burst pressure value and a maximum collapse pressure value, the method further comprising:

providing an indication of one of a casing burst or casing collapse event; and providing a graphical indication that the pressure of the fluid in the annulus exceeds one of the maximum burst pressure value or the maximum collapse pressure value.

7. The method of claim 6, further comprising providing at least one of:
   a maximum burst pressure value of one casing string in between two annuli;
   a maximum collapse pressure value of the one casing string in between the two annuli; and
   a value of an annular fluid expansion in one of the two annuli.

8. The method of claim 1, further comprising:
   performing a stress analysis on at least one of a casing string or the production tubing of the well configuration exposed to a thermal event; and
   determining a temperature deration of the casing string or the production tubing based on the stress analysis.

9. The method of claim 1, wherein the wellbore operation comprises a production operation of a hydrocarbon from a subterranean zone through the wellbore, the method further comprising at least one of:
   receiving an identification of the hydrocarbon;
   receiving a value of a rate of production of the hydrocarbon through the wellbore; and
   receiving an identification of a thermal-flow calculation mode, a steady state condition of the production operation, and a transient condition of the production operation.

10. The method of claim 9, further comprising:
    receiving a value of a hydrostatic pressure of the hydrocarbon at or near the subterranean zone; and
    receiving a value of a temperature of the hydrocarbon at or near the subterranean zone.

11. The method of claim 1, wherein the wellbore operation comprises an operation for displacing a volume of drilling mud in the annulus with a volume of seawater, and wherein receiving a selection of a wellbore operation performed with the well configuration comprises:
    receiving a value of a flowrate of the seawater into the annulus;
    receiving a value of a temperature of the seawater; and
    receiving an identification of a thermal-flow calculation mode, a steady state condition of the displacement operation, and a transient condition of the displacement operation.

12. The method of claim 1, further comprising:
    determining that the production casing is not cemented in the wellbore; and
    determining, based on the well configuration, the wellbore operation and the determination that the production casing is not cemented in the wellbore, the characteristic of the well at or adjacent the one or more casing strings and the production tubing during the wellbore operation.

13. An apparatus comprising a non-transitory and tangible computer readable media, the media comprising instructions operable when executed to cause one or more computing systems to perform operations comprising:
    receiving, based on user interaction with a graphical user interface (GUI), a selection of a well configuration of a well, the selection comprising of one or more casing strings and a production tubing extending from adjacent a wellhead of the well to adjacent a bottom of the well;
    receiving, based on user interaction with the GUI, a selection of a wellbore operation performed with the well configuration;
    determining, based on the well configuration and the wellbore operation, a characteristic of the well at or adjacent the one or more casing strings and the production tubing during the wellbore operation, and displaying the characteristic on the GUI;
    modifying the user-selected well configuration to remove the production tubing; and
    determining, based on the modified well configuration and the wellbore operation, the characteristic of the well at or adjacent the one or more casing strings during the wellbore operation, and displaying the characteristic on the GUI.

14. The apparatus of claim 13, wherein the characteristic comprises at least one of:
    a temperature of a fluid within an annulus defined between two casing strings;
    a temperature of a casing string in the one or more casing strings in the wellbore;
    a pressure of the fluid in the annulus;
    a thermal property of the well configuration; and
    a displacement force acting on a casing string in the one or more casing strings in the wellbore.

15. The apparatus of claim 14, wherein the operations further comprise:
    comparing the displacement force with a predetermined static force acting on the casing string; and
    providing, based on the comparison, an indication that well integrity of the well is compromised.

16. The apparatus of claim 15, wherein the static force comprises a lock ring rating value, and wherein the operations further comprise:
    providing, based on the comparison, an indication of a lift-off event of the casing string; and
    providing an indication that the displacement force exceeds the lock ring rating value.

17. The apparatus of claim 14, wherein the operations further comprise:
    comparing the pressure of the fluid in the annulus with a predetermined range of pressure values; and
    providing, based on the comparison, an indication that well integrity of the well is compromised.

18. The apparatus of claim 17, wherein the predetermined range of pressure values comprises a maximum burst pressure value and a maximum collapse pressure value, and wherein the operations further comprise:
    providing an indication of one of a casing burst or casing collapse event; and
    providing a graphical indication that the pressure of the fluid in the annulus exceeds one of the maximum burst pressure value or the maximum collapse pressure value.

19. The apparatus of claim 18, wherein the operations further comprise providing at least one of:
    a maximum burst pressure value of one casing string in between two annuli;
    a maximum collapse pressure value of the one casing string in between the two annuli; and
    a value of an annular fluid expansion in one of the two annuli.

20. A computing system, comprising
    one or more memory modules;
    one or more processors;
    a graphical user interface; and a well integrity tool stored on one or more of the memory modules, the well integrity tool operable when executed with the one or more processors to perform operations comprising:
  receiving, based on user interaction with a graphical user interface (GUI), a selection of a well configuration of a well, the selection comprising of one or more casing strings and a production tubing extending from adjacent a wellhead of the well to adjacent a bottom of the well;
  receiving, based on user interaction with the GUI, a selection of a wellbore operation performed with the well configuration;
  determining, based on the well configuration and the wellbore operation, a characteristic of the well at or adjacent the one or more casing strings and the production tubing during the wellbore operation, and displaying the characteristic on the GUI;
  modifying the user-selected well configuration to remove the production tubing; and
  determining, based on the modified well configuration and the wellbore operation, the characteristic of the well at or adjacent the one or more casing strings during the wellbore operation, and displaying the characteristic on the GUI.

21. The system of claim 20, wherein the characteristic comprises at least one of:
  a temperature of a fluid within an annulus defined between two casing strings;
  a temperature of a casing string in the one or more casing strings in the wellbore;
  a pressure of the fluid in the annulus;
  a thermal property of the well configuration; and
  a displacement force acting on a casing string in the one or more casing strings in the wellbore.

* * * * *